United States Patent
Gura et al.

(10) Patent No.: US 7,006,501 B1
(45) Date of Patent: Feb. 28, 2006

(54) DISTRIBUTED LEAST CHOICE FIRST ARBITER

(75) Inventors: Nils Gura, Ulm (DE); Hans Eberle, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 818 days.

(21) Appl. No.: 09/621,031

(22) Filed: Jul. 21, 2000

Related U.S. Application Data

(63) Continuation-in-part of application No. 09/540,729, filed on Mar. 31, 2000.

(51) Int. Cl.
*H04L 12/56* (2006.01)

(52) U.S. Cl. .................... 370/395.42; 370/462

(58) Field of Classification Search ........ 370/254–258, 370/270, 437–439, 462–466, 445–448, 395.4, 370/395.41, 395.42, 422, 443, 444, 230, 370/380, 398; 710/20–39, 100, 107, 111–116, 710/119–127, 309, 240–249; 711/151, 158
See application file for complete search history.

(56) References Cited

U.S. PATENT DOCUMENTS

| | | | |
|---|---|---|---|
| 3,676,846 A | | 7/1972 | Busch |
| 4,648,029 A | * | 3/1987 | Cooper et al. .............. 710/113 |
| 4,760,521 A | * | 7/1988 | Rehwald et al. ............ 711/106 |
| 5,301,279 A | * | 4/1994 | Riley et al. ..................... 710/41 |
| 5,550,815 A | | 8/1996 | Cloonan et al. |
| 5,560,016 A | | 9/1996 | Fiebrich et al. ............. 395/728 |
| 5,564,062 A | | 10/1996 | Meaney et al. ............. 395/732 |
| 5,577,035 A | | 11/1996 | Hayter et al. |
| 5,617,575 A | | 4/1997 | Sakakibara et al. ......... 395/800 |
| 5,742,594 A | * | 4/1998 | Natarajan ................... 370/336 |
| 5,821,875 A | | 10/1998 | Lee et al. |
| 5,835,491 A | * | 11/1998 | Davis et al. ................ 370/386 |
| 6,023,732 A | | 2/2000 | Moh et al. |
| 6,029,217 A | * | 2/2000 | Arimilli et al. ............. 710/107 |
| 6,069,573 A | * | 5/2000 | Clark et al. ................. 711/108 |
| 6,072,772 A | | 6/2000 | Charny et al. |
| 6,111,886 A | | 8/2000 | Stewart |
| 6,160,812 A | | 12/2000 | Bauman et al. |

(Continued)

FOREIGN PATENT DOCUMENTS

EP 0 463 943 A2 1/1992

(Continued)

OTHER PUBLICATIONS

Chun, Mainwaring et al., "Virtual Network Transport Protocols for Myrinet", Computer Science Division University of California at Berkeley, Aug. 20, 1997, pp. 1-14.

(Continued)

*Primary Examiner*—Hassan Kizou
*Assistant Examiner*—Dmitry Levitan
(74) *Attorney, Agent, or Firm*—Zagorin O'Brien Graham LLP

(57) ABSTRACT

A distributed arbiter prioritizes requests for resources based on the number of requests made by each requester. Each resource gives the highest priority to servicing requests made by the requester that has made the fewest number of requests. That is, the requester with the fewest requests (least number of choices) is chosen first. Resources may be scheduled sequentially or in parallel. If a requester receives multiple grants from resources, the requester may select a grant based on resource priority, which is inversely related to the number of requests received by a granting resource. In order to prevent starvation, a round robin scheme may be used to allocate a resource to a requester, prior to issuing grants based on requester priority.

56 Claims, 15 Drawing Sheets

U.S. PATENT DOCUMENTS

| | | | |
|---|---|---|---|
| 6,370,148 B1 * | 4/2002 | Calvignac et al. | 370/412 |
| 6,449,283 B1 * | 9/2002 | Chao et al. | 370/461 |
| 6,473,103 B1 * | 10/2002 | Bailey et al. | 345/794 |
| 6,487,213 B1 | 11/2002 | Chao | |
| 6,570,873 B1 | 5/2003 | Isoyama et al. | |
| 6,580,720 B1 | 6/2003 | Francis et al. | |
| 6,667,955 B1 | 12/2003 | Blanc et al. | |

FOREIGN PATENT DOCUMENTS

| | | |
|---|---|---|
| EP | 0 868 054 A2 | 9/1998 |
| EP | 1 096 387 A1 | 5/2001 |
| WO | WO 00/29956 | 5/2000 |

OTHER PUBLICATIONS

Scott, Steven L., "Synchronization and Communication in the T3E Multiprocessor", Cray Research, Inc., 1996, pp. 26-36.

Mainwaring and Culler, "Active Message Applications Programming Interface and Communication Subsystem Organization", Draft Technical Report, Computer Science Division University of California at Berkeley, Technical Report UCB CSD-96-918, Oct. 1996, pp. 1-45.

Kai Y. Eng, Michael G. Hluchyj, and Yu-Shuan Yeh, "A Knockout Switch for Variable-Length Packets," IEEE Journal on Selected Areas in Communications, vol. SAC-5, No. 9, Dec., 1987, pp. 1426-1435.

Martin Collier and Tommy Curran, "Path Allocation in a Three-Stage Broadband Switch with Intermediate Channel Grouping," INFOCOM '93, Proceedings Twelfth Annual Joint Conference of the IEEE Computer and Communications Societies, Networking: Foundation for the Future, IEEE, vol. 3, Mar. 28-Apr. 1, 1993, pp. 927-934.

Martin Collier and Tommy Curran, "Cell-Level Path Allocation in a Three-Stage ATM Switch," Communications, 1994, iCC 94, SUPERCOMM/ICC '94, Conference Record, Conference on Serving Humanity Through Communications, IEEE International, vol. 2, May 1-5, 1994, pp. 1179-1183.

Boden, Cohen et al., "Myrinet: A Gigabit-per-Second Local Area Network", IEEE 1995, pp. 29-36.

Tamir and Chi, "Symmetric Crossbar Arbiters for VLSI Communication Switches", IEEE Transactions on Parallel and Distributed Systems, vol. 4, No. 1, 1993, pp. 13-27.

Kronenberg, Levy et al., "VAXclusters: A Closely-Coupled Distributed System", ACM Transactions on Computer Systems, vol. 4, No. 2, May 1986, pp. 130-146.

Dally, William J., "Virtual-Channel Flow Control", IEEE 1990, pp. 60-68.

Chun, Mainwaring et al., "Virtual Network Transport Protocols for Myrinet", IEEE vol. 18, No. 1, 1998, pp. 52-63.

Pakin, Kararncheti et al., "Fast Messages: Efficient, Portable Communication for Workstation Clusters and MPPs", IEEE 1997, pp. 60-73.

Karol, Hluchyj et al., "Input Versus Output Queueing on a Space-Division Packet Switch", IEEE 1987, pp. 1347-1356.

Scott and Thorson, "The Cray T3E Network: Adaptive Routing in a High Performance 3D Torus", HOT Interconnects IV, Stanford University, Aug. 15-16, 1996, pp. 1-10.

Mainwaring and Culler, "Design Challenges of Virtual Networks: Fast, General-Purpose Communication", ACM SIGPLAN Symposium on Principles and Practice of Parallel Programming (PPOPP), Atlanta, GA, May 4-6, 1999.

Sun Microsystems, Inc., "The Sun Enterprise Cluster Architecture Technical White Paper", 1997, pp. 1-74.

IBM, "JES2 Introduction", Document No. GC28-1794-02, Third Edition, 1997, pp. 1-51.

ANSI, "Information Technology—Scheduled Transfer Protocol (ST)", T11.1/Project 1245-D/Rev. 3.6, Jan. 31, 2000, pp. 1-97.

* cited by examiner

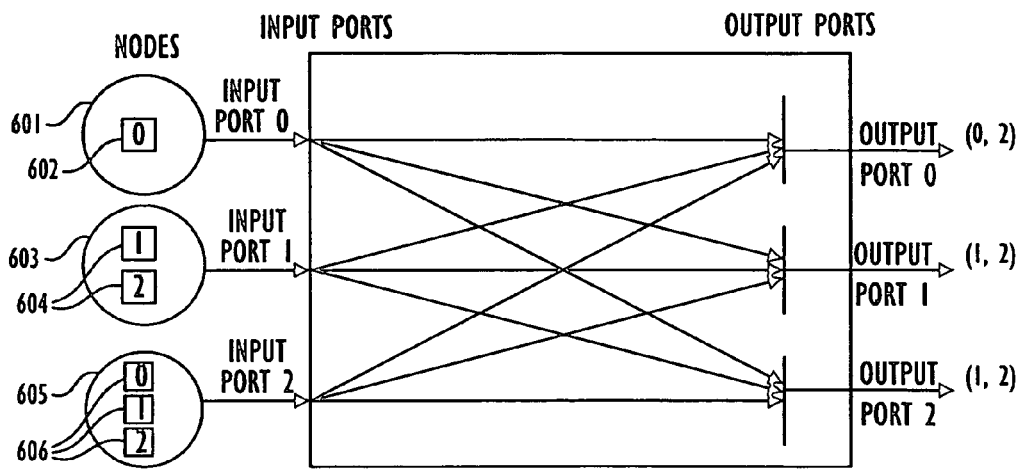
FIG. 6
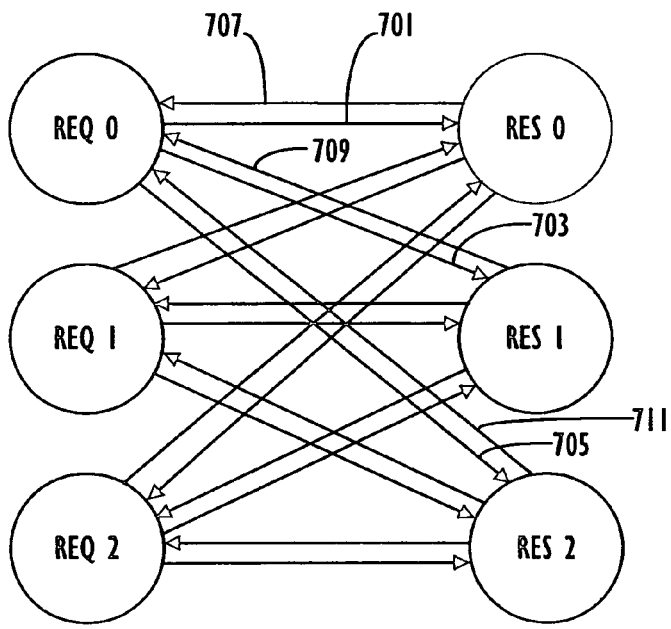
FIG. 7
|  | Output Port 0 | Output Port 1 | Output Port 2 |
|---|---|---|---|
| REQUEST VECTOR 0 | 1 | 0 | 0 |
| REQUEST VECTOR 1 | 0 | 1 | 1 |
| REQUEST VECTOR 2 | 1 | 1 | 1 |
FIG. 8

FIG. 9A

RESOURCES

|  | 0 | 1 | 2 | 3 |
|---|---|---|---|---|
| 0 | (0) | 1 | 1 | ⓪ |
| 1 | ⊗ | 1 | 1 | 1 |
| 2 | 1 | ⓪ | 1 | 1 |
| 3 | 0 | 1 | ⓪ | 0 |

REQUESTERS on left, R: on top

| RES | NRQ |
|---|---|
| 0 | 0 : 2 |
|  | 1 : 4 |
|  | 2 : 3 |
|  | 3 : 1 |

○ ROUND-ROBIN POSITION
✕ GRANTED REQUEST
I = 1, J = 0

FIG. 9B

RESOURCES

|  | 0 | 1 | 2 | 3 |
|---|---|---|---|---|
| 0 | 0 | 1 | 1 | ⓪ |
| 1 | ⊗ | 0 | 0 | 0 |
| 2 | 1 | ⓪ | 1 | 1 |
| 3 | 0 | ✕ | ⓪ | 0 |

| RES | NRQ |
|---|---|
| 1 | 0 : 2 |
|  | 1 : 0 |
|  | 2 : 2 |
|  | 3 : 1 |

○ ROUND-ROBIN POSITION
✕ GRANTED REQUEST
I = 1, J = 0

RESOURCES

R:  0  1  2  3

| Requester | 0 | 1 | 2 | 3 |
|---|---|---|---|---|
| 0 | 0 | 1 | ✳ | ⓪ |
| 1 | ⊗ | 0 | 0 | 0 |
| 2 | 1 | ⓪ | 1 | 1 |
| 3 | 0 | ✗ | ⓪ | 0 |

| RES | NRQ |
|---|---|
| 2 | 0 : 1 |
|   | 1 : 0 |
|   | 2 : 2 |
|   | 3 : 0 |

○ ROUND-ROBIN POSITION
✗ GRANTED REQUEST
I = 1, J = 0

FIG. 9C

RESOURCES

R  0  1  2  3

| Requester | 0 | 1 | 2 | 3 |
|---|---|---|---|---|
| 0 | 0 | 0 | ✗ | ⓪ |
| 1 | ⊗ | 0 | 0 | 0 |
| 2 | 1 | ⓪ | 1 | ✳ |
| 3 | 0 | ✗ | ⓪ | 0 |

| RES | NRQ |
|---|---|
| 3 | 0 : 0 |
|   | 1 : 0 |
|   | 2 : 1 |
|   | 3 : 0 |

○ ROUND-ROBIN POSITION
✗ GRANTED REQUEST
I = 1, J = 0

|   | RESOURCES | | | |
|---|---|---|---|---|
| R: | 0 | 1 | 2 | 3 |
| 0 | 0 | 0 | ✳ | ⓪ |
| 1 | ⊛ | 1 | 1 | 1 |
| 2 | 1 | ⓪ | 1 | 1 |
| 3 | 0 | ✳ | ⓪ | 1 |

REQUESTERS

| IT | NRQ | GNT | NRS | ACC |
|---|---|---|---|---|
| 0 | 0:1 | 0:1 | 0:2 | 0:2 |
|   | 1:4 | 1:3 | 1:2 | 1:0 |
|   | 2:3 | 2:0 | 2:3 | 2:-1 |
|   | 3:2 | 3:3 | 3:3 | 3:1 |

○ ROUND-ROBIN POSITION
✕ GRANT ACCEPTED BY REQUESTOR
☐ GRANT SENT BY RESOURCE

|   | RESOURCES | | | |
|---|---|---|---|---|
| R: | 0 | 1 | 2 | 3 |
| 0 | 0 | 0 | ✳ | ⓪ |
| 1 | ⊛ | 0 | 0 | 0 |
| 2 | 1 | ⓪ | 1 | ✳ |
| 3 | 0 | ✳ | ⓪ | 0 |

REQUESTERS

| IT | NRQ | GNT | NRS | ACC |
|---|---|---|---|---|
| 1 | 0:0 | 0:1 | 0:1 | 0:2 |
|   | 1:0 | 1:3 | 1:0 | 1:0 |
|   | 2:3 | 2:0 | 2:1 | 2:3 |
|   | 3:0 | 3:2 | 3:1 | 3:1 |

○ ROUND-ROBIN POSITION
✕ GRANT ACCEPTED BY REQUESTOR
☐ GRANT SENT BY RESOURCE

I = 1, J = 0

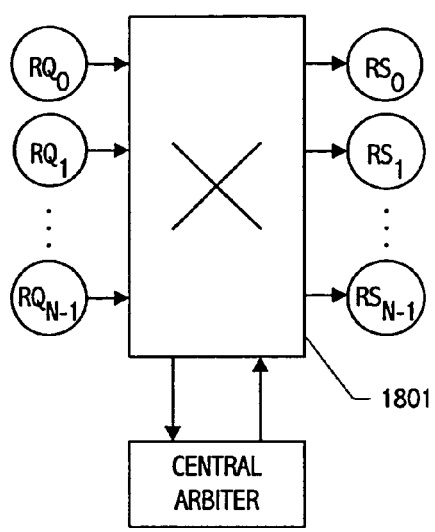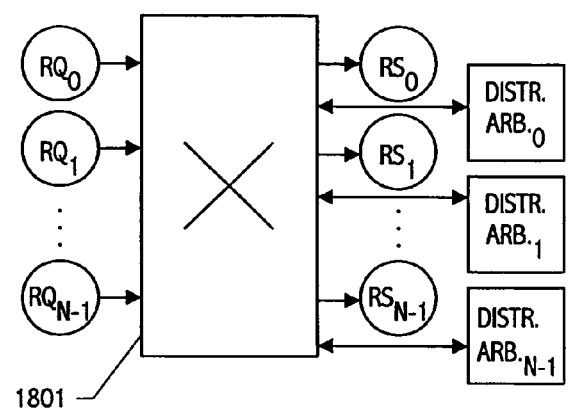
FIG. 18A  FIG. 18B

DISTRIBUTED LEAST CHOICE FIRST ARBITER

RELATED APPLICATIONS

This application is a continuation in part of application Ser. No. 09/540,729, filed Mar. 31, 2000, entitled "Least Choice First Arbiter", naming as inventors Hans Eberle and Nils Gura, which application is incorporated herein by reference in its entirety.

COPYRIGHT NOTICE

A portion of the disclosure of this patent document including Appendices A, B, C and D, contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

This invention relates to systems having shared resources and more particularly to arbitrating multiple requests for multiple resources is such systems.

2. Description of the Related Art

Systems having shared resources are common. In many such systems, arbiters have to schedule usage of the shared resources to prevent conflicts resulting from requests for simultaneous access to the same shared resource. One example of such a system having shared resources susceptible to conflicts is a crossbar switch having multiple input ports and multiple output ports in which input ports make requests for connection to the output ports. Each requester or input port sends a request for an output port or a set of requests for multiple output ports to an arbiter. A particular output port may be requested by multiple input ports at the same time. Assuming an output port can be allocated to only one input port at a time, an arbitration decision is made to award the output port to one of the requesters. The arbiter chooses the requests to be granted such that resources (the output ports) are allocated to requesters in a conflict-free way. Thus, certain requests are serviced by being granted an output port and certain requests may be left unserviced in that they are denied an output port. However, the choice of which requests to grant may lead to under-utilization of the resources since some requests may be denied.

Another example of a system having shared resources is a computer system in which multiple processors are coupled to multiple memories. Assume that each processor has access to all of the memories and each memory can only be accessed by one processor at a time. When multiple processors request access to the same memory at the same time an arbitration decision has to be made as to which processor gets to access the memory in question.

While numerous arbitration schemes have been developed to try and provide fair and efficient allocation of system resources for scheduling problems that involve multiple requesters requesting multiple shared resources such as the crossbar switch or multi-processor system described above, it would be desirable to have an improved arbitration scheme that provides for high aggregate usage of the shared resources while still providing a minimum level of fairness.

SUMMARY OF THE INVENTION

Accordingly, the invention provides in one embodiment an arbiter that prioritizes requests based on the number of requests made. The highest priority is given to the requester that has made the fewest number of requests. That is, the requester with the fewest requests (least number of choices) is chosen first. Requesters with more requests have more choices than requesters with fewer requests and, therefore have a reasonable likelihood of being granted one of their outstanding requests if considered after those requesters with fewer requests. Resources may be scheduled sequentially or in parallel. In order to prevent starvation, a round robin scheme may be used to allocate a resource to a requester, prior to issuing grants based on requester priority.

If multiple grants are received by a requester, the requester may prioritize the received grants according to resource priority, that is, according to the number of requests received by the resource. The resource receiving the fewest requests has the highest priority. Utilizing a strategy that considers fewest choices first, increases the number of granted requests and results in higher aggregate resource usage when compared with other arbitration schemes. A round robin scheme may also be utilized to prevent starvation when accepting grants. Resources may be allocated sequentially or in parallel.

In one embodiment, the invention provides a method for operating a distributed arbiter for a plurality of resources, that includes receiving requests at one of the resources from a plurality of requesters. The resource grants the one resource to one of the requesters according to requester priorities, the requester priorities being inversely related to a number of requests made respectively, by the requesters.

In another embodiment, a distributed arbiter includes a plurality of requesters and a plurality of resources coupled to the requesters through a transport mechanism, such as a bus or switch. Each requester is coupled to provide to each resource requested by the respective requester with a request indication. A requested resource is responsive to a plurality of requests to selectively grant one of the requests according to requester priorities, the requester priorities being inversely related to a number of requests being made by respective requesters.

BRIEF DESCRIPTION OF THE DRAWINGS

The present invention may be better understood, and its numerous objects, features, and advantages made apparent to those skilled in the art by referencing the accompanying drawings wherein use of the same reference symbols in different drawings indicates similar or identical items.

FIG. 6 illustrates a switch that utilizes a distributed embodiment of the present invention.

FIG. 7 illustrates the requests and grants passed by requesters and resources in an exemplary distributed system.

FIG. 8 illustrates exemplary vectors of requests sent from a requestor to a resource in an exemplary distributed system.

FIGS. 9A–9D illustrate operation of a sequential distributed arbiter, also described in Appendix C, according to an embodiment of the invention.

FIG. 11A–11B illustrate operation of a parallel distributed arbiter, also described in Appendix D, according to an embodiment of the invention.

FIGS. 18A and 18B show high level block diagrams of a centralized and distributed arbiter.

DESCRIPTION OF THE PREFERRED EMBODIMENT(S)

Figure 1:
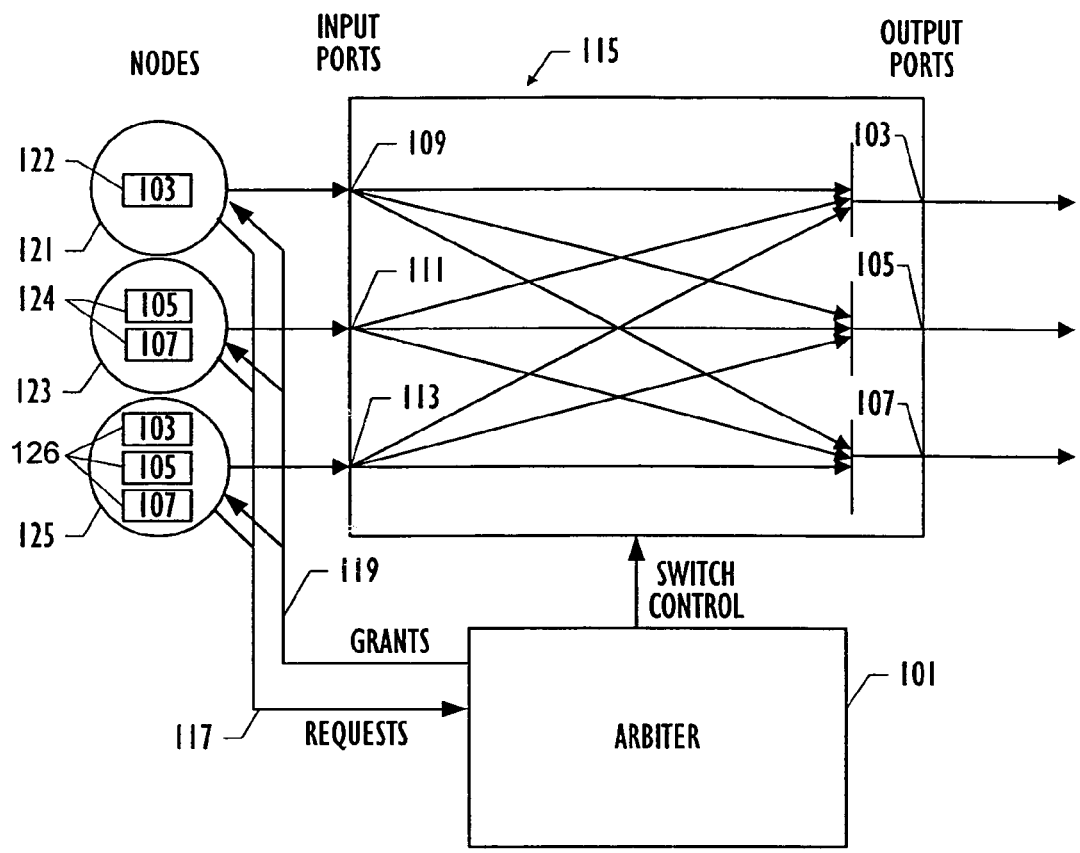
FIG. 1 shows a crossbar switch which can exploit one or more embodiments of the present invention.

Referring to FIG. 1, one embodiment of the invention is illustrated in which arbiter 101 schedules usage of shared resources, i.e., output ports 103, 105 and 107 among input port requesters, 109, 111 and 113. Crossbar switch 115 forwards packets from its input ports, 109, 111 and 113 to its output ports 103, 105 and 107. Each input port can hold multiple packets destined for different output ports. The switch schedule to be calculated should connect input and output ports in such a way that as many packets as possible can be forwarded simultaneously, thus trying to maximize usage of shared resources. Each requester sends a set of requests to arbiter 101, which then chooses the requests to be granted such that resources are allocated to requesters in a conflict-free way.

In one embodiment of the invention, the arbiter operates in a synchronous manner in that the arbiter receives request signals 117 for shared resources at the same time from the various nodes 121, 123 and 125. Scheduling happens synchronously in that grant signals 119 are sent at the same time and the usage interval for each resource has the same length. Scheduling may be further constrained in that only one requester can use a particular resource at the same time. When developing an arbitration scheme the main goal typically is to achieve high aggregate usage of the resources while still providing a minimum level of fairness, mainly in the sense that starvation of individual requests is prevented.

In one embodiment, the arbiter makes its choices by prioritizing requesters based on the number of their requests. The highest priority is given to the requester with the fewest number of outstanding requests, and the lowest priority is given to the requester with the highest number of outstanding requests. Resources are scheduled one after the other in that a resource is allocated to the requester with the highest priority first. That way the requester with the least number of choices is chosen first. Thus, priority is inversely related to the number of requests being made. Requesters with many requests have more choices than requesters with fewer requests and, therefore, can be considered later and still have a reasonable likelihood of being granted one of their outstanding requests. That strategy increases the number of granted requests and, with it, results in higher aggregate usage when compared with other arbitration schemes. In one preferred embodiment, the number of outstanding requests is based only on the resources that have not yet been scheduled. That is, the number of outstanding requests is recalculated whenever a resource has been scheduled.

With reference again to FIG. 1, an example illustrates operation of one aspect of an embodiment of the least choice first arbiter. In FIG. 1, it can be seen that node 121, which is coupled to input port 109, has one request 122 for output port 103. Node 123, which is coupled to input port 111, has two requests 124, one request for output port 105 and one request for output port 107, respectively. Node 125, which is coupled to input port 113, has three requests 126, one request for each of the output ports. The arbiter receives those requests from the various nodes and prioritizes the request from node 121 (input port 109) as the highest priority request since that requester has only one request. Node 123 is prioritized as the next highest priority requester since it has two requests and node 125 is the lowest priority requester since it has three requests.

Based upon priority alone, arbiter 101 grants node 121 its request for output port 103 first. Note that while the node attached to the input port is actually making requests, for ease of description, the input ports themselves may be described herein as having requests. After arbiter 101 grants node 121 its request, priorities are recalculated. Both node 123 and node 125 have the same priority after output port 103 is scheduled, since they both have two requests (requests for output port 103 are no longer considered since that output port has been scheduled). The arbiter can now grant one of the requests of node 123 and node 125. For example, if the arbiter grants node 123 its request for output port 105, the arbiter then grants node 125 its request for output port 107. Because the arbiter serviced the requester having the least number of choices first, the number of granted requests can be maximized. To illustrate that, if another arbitration scheme had first granted node 125 its request for output port 103, a total of only two requests would have been granted. Note that the arbiter has not considered fairness in allocating the resources in the example given.

Figure 2:
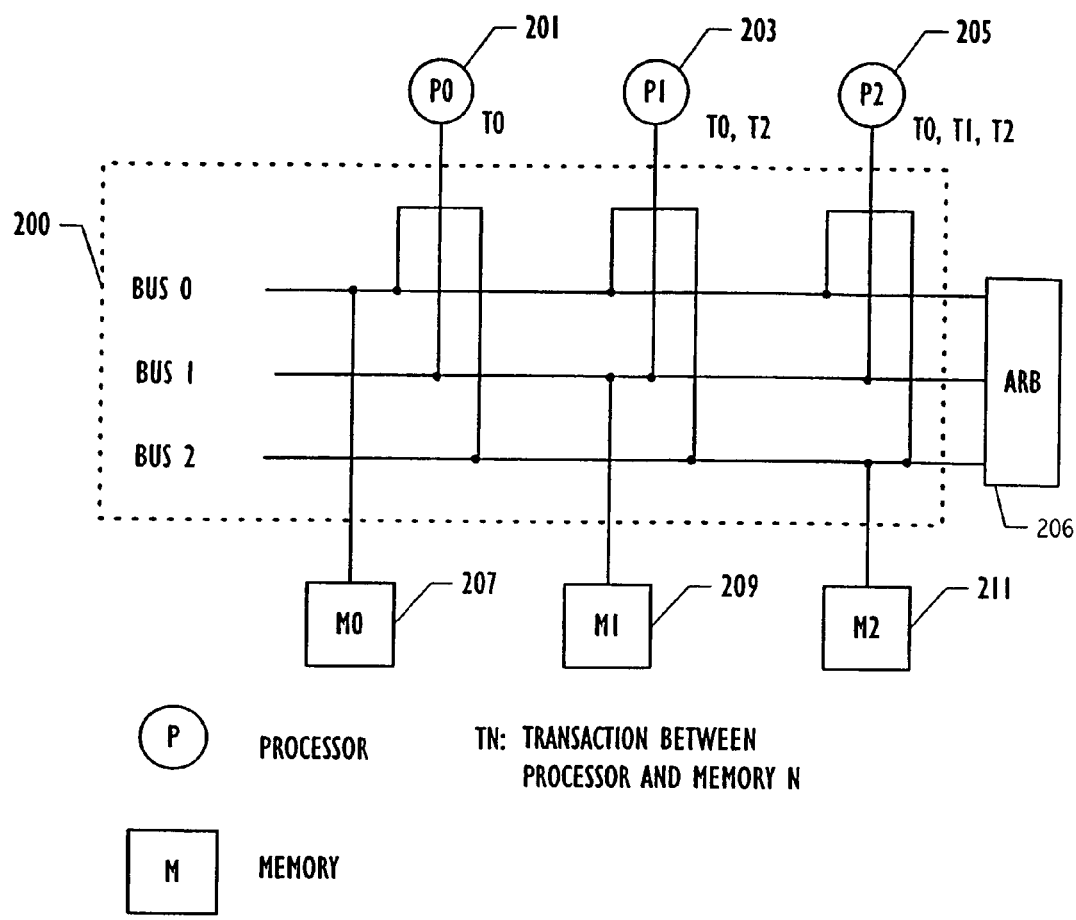
FIG. 2 shows a multi-processor system which can exploit one or more embodiments of the present invention.

Another example where such an arbitration scheme may be utilized is shown in FIG. 2, which is a multi-bus interconnection structure 200 functioning as a transport mechanism for connecting multiple processors 201, 203 and 205 (also referred to in FIG. 2 as P0, P1 and P2) with multiple memories 207, 209 and 211 (also referred to in FIG. 2 as M0, M1 and M2). Each processor can have multiple outstanding transactions such as read and write operations. Similar to the switch embodiment described in relation to FIG. 1, the bus schedule to be calculated connects processors and memories in a conflict-free way, ideally, such that at a given time as many transactions as possible can be executed in parallel.

The arbiter 206 may be coupled to each of the buses shown in FIG. 2. The request and grant lines may be incorporated into the buses as well or may be separately coupled to the arbiter. In fact, the arbiter, rather than being separate as shown, may in fact reside in one or more of the processors or memories, or be distributed among the processors and memories in a manner described further herein.

Assuming a central arbitration scheme utilizing arbiter 206, processor P0 requests transaction T0 for memory M0 from the arbiter, processor P1 requests transactions T0 and T2 for memories M0 and M2, respectively. Processor P2 requests transactions T0, T1 and T2 to memories M0, M1 and M2, respectively. As with the switch embodiment described previously, the arbiter gives the highest priority to processor P0 since that processor has the fewest requests. After P0 is granted its T0 request, P1 has one request pending and P2 has two requests pending, since M0 has already been allocated. Thus, P1 is granted its T2 request since it has higher priority (only one request) and finally P2 is granted its T1 request. Thus, the arbiter grants P0 its T0 request, P1 its T2 request and P2 its T1 request, thus maximizing utilization of buses 200.

An additional factor to be considered in developing an arbitration scheme is to provide fairness in the sense of avoiding starvation for any particular request. Thus, a round robin scheme may be employed in addition to the arbiter prioritizing the requester with the fewest requests first. Various round robin approaches will be described further herein.

A detailed description of an arbiter is provided in the program listing in Appendix A showing procedure arbitrate, which describes one embodiment of an arbiter according to the present invention. There are two main data structures of the interfaces of procedure arbitrate. The first is the Boolean matrix R, which represents the input signals to the arbiter. R[i,j] indicates whether requester i is requesting resource j. The second main data structure is the integer array S, which represents the output values of the arbiter. S[i] indicates which resource is allocated to requester i.

The program listing illustrates the operation of one embodiment of the arbiter each time the arbiter receives requests from the plurality of requesters. As described previously, those requests may be received synchronously. On entry into the arbitration sequence as represented in the procedure arbitrate, the schedule S is initialized (line 16) to show no requests have been granted and the number of requests are calculated for each requester (lines 18–19). Then for each resource available to the requesters, the procedure first determines if the round robin position is asserted. If so, the request is granted. (lines 24–25).

The round robin position in the illustrated embodiment is determined by the index variables I and J along with the loop variable res. For every "schedule cycle", the requester offset I is incremented (lines 47–48). If I rolls over, the resource offset J is incremented. A schedule cycle includes the execution of the code described by the procedure arbitrate, including the round-robin determination and least choice first arbitration. Note that all resources are scheduled during a schedule cycle.

Starting with I=0 and J=0 for the first schedule cycle, the round robin positions in R[i,j] for three requesters [0:2] and three resources [0:2] for four schedule cycles of the embodiment described in Appendix A are as follows:

Schedule cycle 0: [0,0], [1,1], [2,2]
Schedule cycle 1: [1,0], [2,1], [0,2]
Schedule cycle 2: [2,0], [0,1], [1,2]
Schedule cycle 3: [0,1], [1,2], [2,0]

Thus, it can be seen that a different position in array R is designated as the start of the round robin for each schedule cycle. The "round-robin positions" within matrix R form a diagonal during every schedule cycle. The starting position for the diagonal moves downward by one element once every schedule cycle (lines 47, 48). When the index J increments, the starting position moves over to the top of the next column in array R. Note that only one of the elements of the diagonal is guaranteed to be granted (if it is asserted) per schedule cycle. That is the first round robin position in each schedule cycle.

While the arbiter has been described in the software listing of procedure arbitrate to provide a detailed example of operation of one embodiment of the arbiter, the same functionality may preferably be implemented in hardware to increase the speed with which the arbiter can respond to requests as described further herein. In other embodiments, portions of the arbiter may be implemented in hardware and other portions in software depending on the needs of a particular system. Further, the iterations of the sequential calculations of the schedule (lines 21–46), may be implemented with the help of look-ahead techniques. That is, as an alternative to the sequential approach described in Appendix A, a look-ahead technique can instead schedule resources in parallel rather than sequentially. Each resource must know what the other resources will decide. Because that information is deterministic, each resource can calculate the needed information. That parallel approach can speed up determinations.

There are additional embodiments of the arbiter. For example, the round-robin scheme can be varied in different ways. If it is desirable to guarantee that more than one element can be granted, the arbiter could consider all elements of the round robin diagonal before other requests are considered each schedule cycle. That is illustrated in detail in Appendix B.

In another embodiment, the "round-robin positions" cover a row of elements in R rather than a diagonal during each schedule cycle. That is illustrated by the following code segment, which replaces lines 24 and 25 in Appendix A.

```
If R[I,(J+res) mod MaxRes] then
    gnt :=I
```

Note that with this embodiment, the requester with the requests covered by the row specified by the round robin positions is guaranteed to be granted one of its requests.

In a similar embodiment, the "round robins positions" cover a column of elements in R rather than a row during each schedule cycle. Note that with this embodiment, the resource requested by requests covered by the column specified by the round robin positions is guaranteed to issue a grant. That is illustrated by the following code segment which replaces lines 24 and 25 in Appendix A.

```
If res =0 then
begin
    r :=0;
    repeat
        if R[(r+I) mod MaxReq, J] then
            gnt :=(r+I) mod MaxReq;
        r :=r+1;
    until (r=MaxReq) or (gnt <>−1);
end
```

Yet another possibility is to only consider one "round-robin position" per schedule cycle as shown in the following code segment, which replaces lines 24 and 25 in Appendix A.

```
If (res=0) and req[I,J] then
    gnt :=I
```

In still another starvation avoidance approach, a round robin scheme ages requests. The longer a request waits, the higher a priority the request receives and the sooner it is considered by the round robin scheme. Any of the round-robin schemes described guarantee that every request is periodically considered. That way, starvation can be prevented. Other schemes may be implemented to prevent starvation as well. In fact, any scheme that guarantees that every request is periodically considered, prevents starvation. For example a statistical approach can be used to provide that guarantee. One example of such an approach is a random scheme that provides a probability that an element will be visited within a particular time period.

The main parameter of a round-robin scheme is the period at which elements of R are visited. For the arbiter described in Appendix A, the worst-case period is the total number of requesters times the total number of resources (MaxReq*MaxRes). The period can be shortened if the round-robin scheme can guarantee that more than one element of R (if asserted) is granted in one schedule cycle such as in the approach illustrated in Appendix B. That can be useful if the matrix R is large.

The period of the round-robin scheme also determines the minimum fraction of resource usage that a requester is guaranteed to obtain. For example, if in FIG. 3A, R[2,1] is always asserted, requester 2 is guaranteed to get access to resource 1 at least once every 9th schedule cycle.

Referring again to the program listing of the procedure arbitrate in Appendix A, once the round robin position has been tested in lines 24 and 25, if the round robin position does receive a grant, then the procedure assigns the granted resource to the position in S corresponding to the requester (lines 39–45) and adjusts number of requests (NRQ values) appropriately.

If no round robin position is true, i.e. no request is being made for that resource by that requester, then the procedure arbitrate determines for a particular resource, i.e., a particular column in R identified by [(res+J) mod MaxRes], the requester with the fewest outstanding requests and that requester is granted its requested resource (lines 29–36).

If either the round robin position or another position in array R is granted a resource, then the procedure updates array S by writing the number of the resource into the position in S corresponding to the requester (line 40). That is S[i] is written with the resource number, where i represents the requester granted the resource. The requester row in array R for the requester that was granted the resource is modified to indicate that there are no requests in that row, since only one request can be granted per requester (line 41)). The number of requests (NRQ) for all the requesters requesting the granted resource is reduced because requests for a resource already allocated cannot be fulfilled and thus are not counted (lines 43–44). The number of requests (NRQ) for the requester that was granted the resource is set to 0 (line 42). The procedure arbitrate then ends by incrementing I and J appropriately (lines 47–48).

Figure 3A:
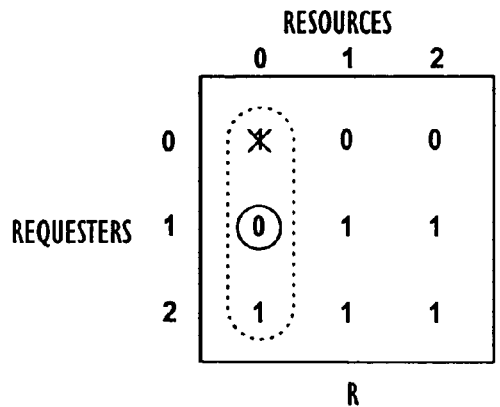
FIGS. 3A–3C illustrate operation of one embodiment of the invention where priorities are determined according to a number of requests each requester makes.

The operation of the embodiment illustrated in procedure arbitrate in Appendix A will now be described with relation to FIGS. 3A–3C. Assume that I and J are at [1,0] on entry into procedure arbitrate and R is as shown as shown in FIG. 3A. Array R shows that there are three requesters in the system and three resources. Requester 0 is requesting resource 0, requester 1 is requesting resources 1 and 2 and requester 3 is requesting resources 1, 2 and 3.

The number of requests is shown for each of the requesters: NRQ[0]=1, NRQ[1]=2 and NRQ[2]=3. The initial round robin position in R evaluated by the arbiter is R [1,0] as a result of the initial value of I and J. Because that position is not asserted (i.e. is false), procedure arbitrate checks if there are any other requests for resource 0, and determines that requester 0 and 2 are requesting resource 0. Because requester 0 has the smallest number of requests (NRQ), the arbiter grants resource 0 to requester 0, as indicated by the X at R[0,0]. Procedure arbitrate zeros out row R[0,x] (made false) and reduces the number of requests for requester 2 by one (NRQ[2]=2) and zeros out the number of requests by requester 0 (NRQ[0]=0) as shown in FIG. 3B.

Figure 3B:
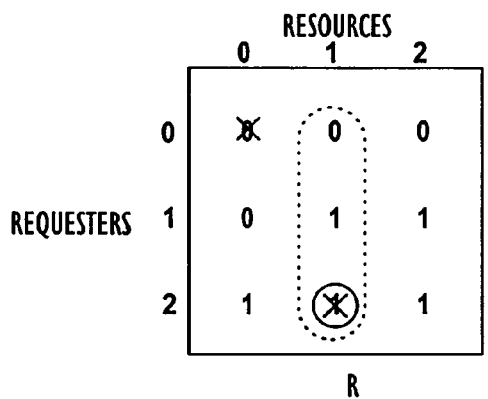

On the next iteration through the allocation loop as shown in FIG. 3B, with the loop variable res=1, the arbiter evaluates round robin position R[2,1] first. Because that position is asserted, the arbiter grants requester 2 that request as indicated by the X. The row R[2,x] is zeroed out (made false) and the number of requests by requester 1 is reduced by one (NRQ[1]=1) as shown in FIG. 3C. The number of requests by requester 2 is set to 0 (NRQ[2]=0). FIG. 3B illustrates that the requester 0 row was zeroed out after the requester was granted a resource in FIG. 3A. The "X" is still shown at R[0,0] to show that resource was allocated to that requester previously.

Figure 3C:
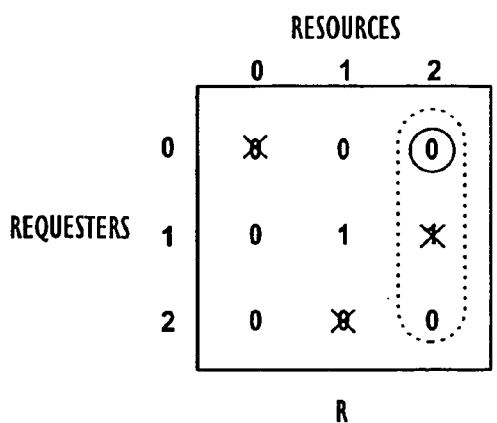

In the final allocation loop of this schedule cycle shown in FIG. 3C, with the loop variable res=2, the arbiter first evaluates round robin position R[0,2]. That position is false so the arbiter determines if there are any other requests for that resource. The only request for that resource is from requester 1 which is granted resource 2. Thus, during that schedule cycle, because the requester with the fewest choice (requester 0) was serviced first, high utilization efficiency of the resources could be achieved.

Figure 4:
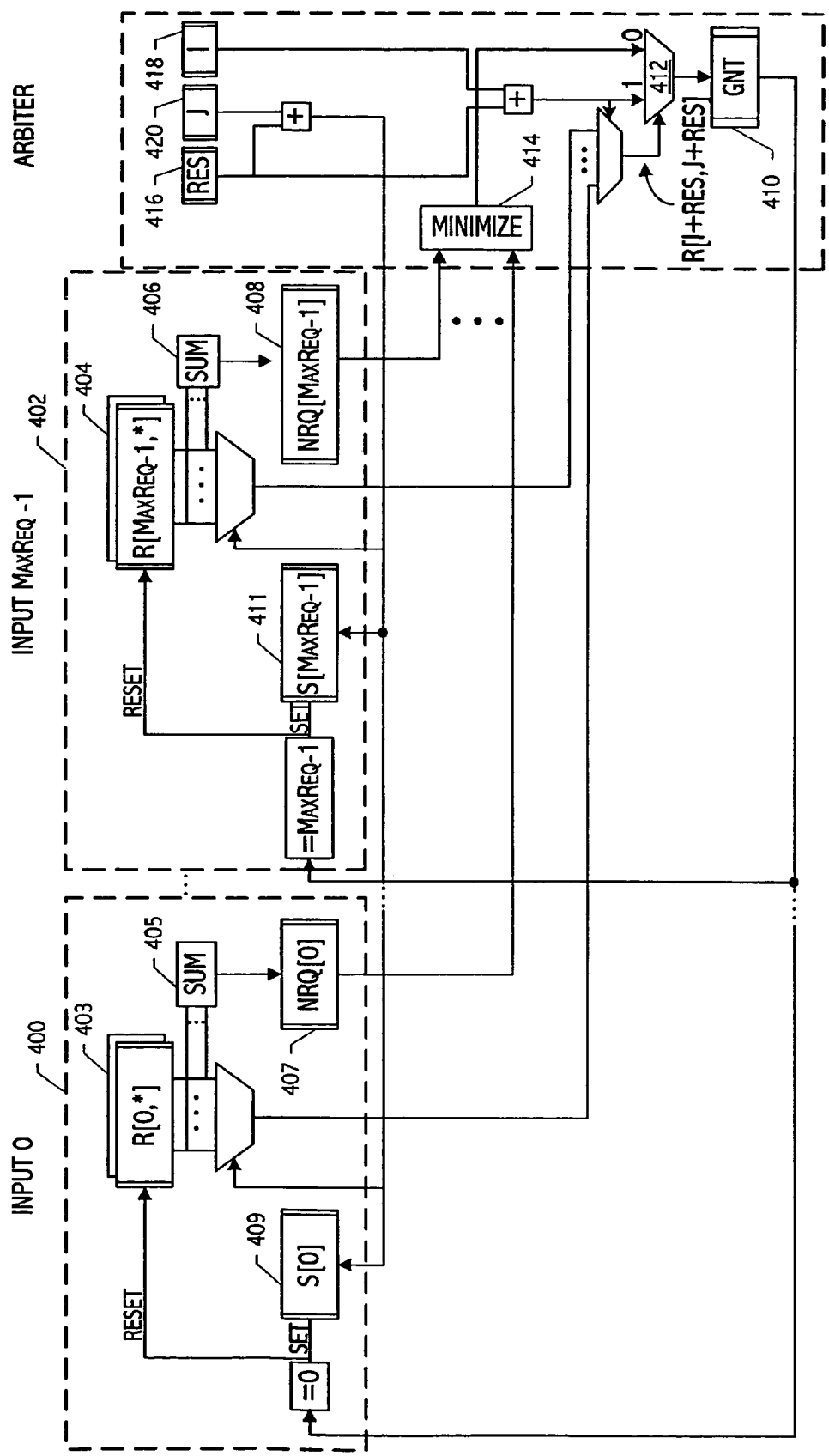
FIG. 4 illustrates a block diagram of a hardware implementation of an arbiter according to one embodiment of the present invention.

As previously stated, if speed is a consideration, which is likely in many if not most applications, a hardware implementation may be preferred. Referring to FIG. 4, a block diagram of a hardware implementation of the arbiter is illustrated. Assume there are MaxReq inputs to the arbiter. FIG. 4 illustrates hardware 400 associated with the first requester (input 0), which corresponds to requester 0 and hardware 402 associated with the last requester (MaxRe-1). The embodiment illustrated in FIG. 4 operates as follows. Each of the elements of R[i,*], which includes elements 403 and 404, is initialized, where * represents the number of resources. Thus, for example, element 403 contains all requests input by the associated requester 0 for the various resources. In addition, the array S, which includes elements 409 and 411 of the illustrated hardware, is reset. The requests for the illustrated elements 403 and 404 are summed in summers 405, 406 to generate a number of requests (NRQs) 407 and 408 for the respective requesters. If R[I+res, J+res]=1, then grant (GNT) 410 is set to (I+res) through multiplexer 412. That is, the round robin position is granted. Otherwise, grant (GNT) 410 is set to the input with the minimum number of requests, which is determined in minimize circuit 414. If there is no request for the current output, grant is set to −1 (note that the logic to set grant to −1 is assumed to be contained within grant (GNT) 410). If grant (GNT) 410 is not −1, then the location S[gnt] (e.g. 409) is set to J+res, which indicates the resource granted to that requester. Each of the elements of R[gnt, *] is set to 0, where * represents the resources. The register 416 holding "res" is incremented so res=res+1. The hardware continues the calculations for S until res=MaxRes, that is, the last resource is scheduled when S[res=MaxRes-1] is evaluated. The register 418 containing the index I is incremented so I=I+1. If I=MaxReq, then I is set to 0 and the register 420 containing J is incremented. The embodiment illustrated in FIG. 4 is an illustrative block diagram and does not show all the details described. As would be known to those of skill in the art, those details along with many other hardware implementations can be provided to implement the various embodiments described herein.

As is apparent from the software descriptions provided, the arithmetic operations are done mod MaxReq and mod MaxRes. Assuming that MaxReq and MaxRes are powers of 2, the mod operations are simply implemented by having fixed number of register bits (MaxReq and MaxRes, respectively).

In another embodiment the calculation of priorities may be varied. For example, rather than assigning priorities to the requesters as illustrated in procedure arbitrate, priorities can be assigned to the resources. More specifically, the priority of a resource is given by the number of requesters that request it. That is, the highest priority is given to the resource that is requested by the fewest number of requesters, and the lowest priority is given to the resource that is requested by the most number of requesters. Resources are assigned to the requesters one after the other.

Figure 5A:
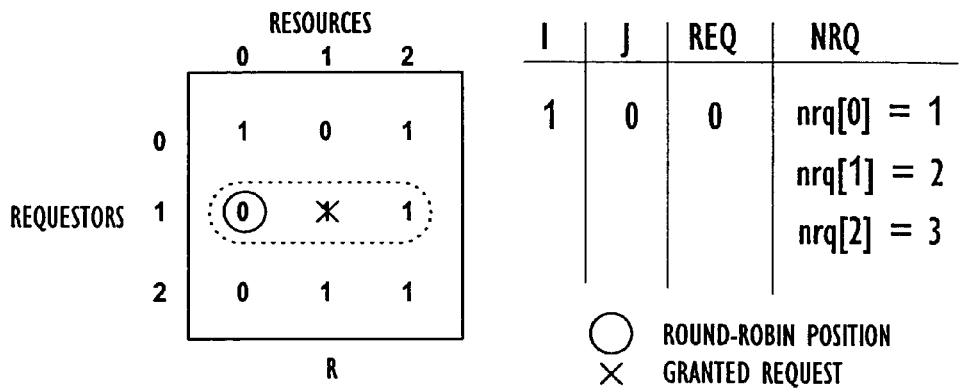
FIGS. 5A–5C illustrate operation of one embodiment of the invention where priorities are determined according to a number of requests each resource receives.
Figure 5B:
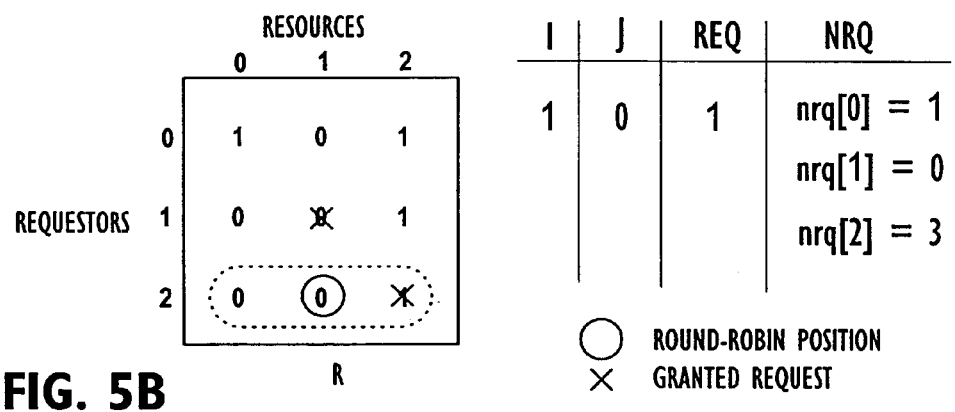
Figure 5C:
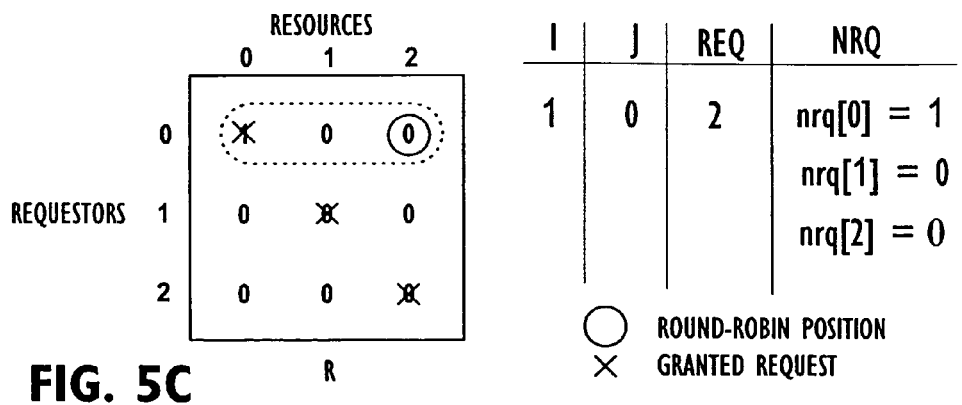

Thus, assuming a configuration as shown in FIGS. 5A–5C, with three requesters and three resources, each requester 0, 1 and 2 is evaluated in turn to see what resources are being requested and the requested resource with the highest priority is granted to that request. Assume the same round robin positions and I and J values as in FIGS. 3A–3C. "Req" represents the loop variable that together with offset I, determines the requester being scheduled. In this embodiment, the arbiter is modified to determine priorities with relation to resources and not requesters.

The number of requests (NRQ) for each of the resources initially is: NRQ[0]=1, NRQ[1]=2 and NRQ[2]=3. Assume the arbiter of this embodiment uses a similar round robin scheme as that used by the arbiter in FIGS. 3A–3B. In FIG. 5A, the arbiter evaluates the initial round robin position R [1,0], which results from the initial value of I and J. Because that position is not asserted (i.e. is false), the arbiter according to this embodiment checks if there are any other requests by requester 1. Because requester 1 is requesting resources 1 and 2 and resource 1 has a higher priority than resource 2, the arbiter grants resource 1 to requester 1. All the requests for resource 1 are zeroed out as shown in FIG. 5B.

On the subsequent iteration to assign resources illustrated in FIG. 5B, the arbiter evaluates the round robin position R[2,1] first. Because that position was zeroed out, the arbiter checks if requester 2 is making any other requests for resources. Requester 2 is also requesting resource 2, its only remaining request and thus the arbiter grants resource 2 to requester 2. The column representing resource 2 is zeroed out. Referring to FIG. 5C, on the final iteration which completes checking all requests in R, the arbiter evaluates round robin position R[0,2] first. Since that position is false, the arbiter then determines if any other resources are being requested by requester 0. Since requester 0 is also requesting resource 0, the arbiter grants that resource to requester 0.

In still another embodiment, the arbiter calculates priorities for both the requesters and resources, and uses those priorities to calculate a priority for each element in R. For example, the number of requests for a particular resource may be added with a number of requests made by a requester, to create each position in R. The scheduler then iteratively grants the request with the highest priority. That way, the priority of an element in R indicates the degree of freedom of its requester as well as of the requested resource. As in other embodiments, a scheme to prevent starvation may be included. However, a scheme to prevent starvation may not always be necessary. For example, some applications may have a guaranteed pattern of requests that makes the need for starvation avoidance unnecessary.

The arbiters described so far have been for a centralized arbiter implementation. A distributed version of the least choice first arbiter is also possible. That version is distributed in that the selection of requests is performed by arbitration logic associated with the resources and requesters rather than by centralized arbiter logic. For example, assume a transport mechanism such as the simple 3×3 switch shown in FIG. 6 having three input ports and three output ports. Thus, there are three requesters and three resources. Node 601, associated with input port 0, has one request 602 for output port 0. Node 603, associated with input port 1, has two requests 604 for output ports 1 and 2, respectively. Node 605 associated with input port 2 had three requests 606, for output ports 0, 1 and 2, respectively. As shown in FIG. 6, output port 0 has requests from input port 0 and input port 2. Output port 1 has requests from input port 1 and input port 2. Output port 2 has requests from input port 1 and input port 2.

Referring to FIG. 7, showing an exemplary distributed implementation for the arbitration scheme disclosed herein, the requesters REQ 0, REQ 1 and PEQ 2 supply request signals to and receive grant signals from each of the resources RES 0, RES 1 and RES 2. For example, requester REQ 0 sends request signal 701, 703 and 705 to resources RES 0, RES 1 and RES 2, respectively. Requester REQ 0 receives grant signals 707, 709 and 711 from resources RES 0, RES 1 and RES 2. In one embodiment, during an arbitration period, each resource receives request vectors indicating which requests are asserted from all requesters. A resource grants one of the received requests according to the priority scheme described herein and notifies that requester via an asserted grant signal.

The request vectors may be provided as shown in FIG. 8 where request vector 0 corresponds to input port 0, request vector 1 to input port 1 and request vector 2 to input port 2. Thus, the request vectors indicate by an asserted bit, which output port is requested. The resources can determine from the request vectors how many requests a particular requester has made. From the example shown in FIGS. 6–8, requester REQ 0 (input port 0) has made 1 request for output port 0, requester REQ 1 (input port 1) has made 2 requests for output ports 1 and 2, and requester REQ 2 (input port 2) has made 3 requests for output ports 0, 1 and 2.

In one embodiment, a sequential scheme is utilized to implement a distributed arbiter. The sequential scheme in that embodiment requires n rounds with n being the number of resources. For each round i (i=0 . . . n−1):

(1) Each requester that has not yet received a grant and that is requesting resource i sends a request. The request is accompanied by a priority which is the inverse of the number of resources that the requester is requesting and that have not yet been scheduled in a previous round. The priority indication may be provided as the number of requests being made by the particular requester.

(2) The resource selects the request with the highest priority (the requester making the fewest requests) and sends a grant to the corresponding requester. If there is more than one request with the highest priority, a round-robin scheme is used to select one of the requesters. Note that all the requesters are informed by all resources when a resource has been granted so requesters know what has been scheduled in a previous round.

The rounds continue until all the resources have been scheduled.

A second embodiment uses an iterative scheme with requesters and resources making choices in parallel. In one iteration of the parallel approach according to this embodiment:

(1) Each requester that has not yet accepted a grant, sends a request to each resource that it is requesting and that has not yet been allocated. The request is accompanied by a priority which is the inverse of the number of requests the requester is sending.

(2) Each resource selects the request with the highest priority. If there is more than one request with the highest priority, a scheme such as a round robin scheme may be used to select one of the requests. A grant is sent to the requester of the selected request. The grant is accompanied by a priority which is the inverse of the number of requests the resource has received.

(3) If a requester receives more than one grant it accepts the grant with the highest priority. If there is more than one grant with the highest priority a round robin scheme is used to select the grant to be accepted. If a grant is accepted, the corresponding resource is allocated.

While in the worst case n iterations are needed to schedule all resources, a smaller number of iterations will generate schedules which are nearly optimal for most patterns of requests.

Note that either or both of the resources and requesters in a distributed approach may still implement a round robin scheme to ensure that no starvation occurs in the system. Further, the distributed arbiter may implement only the least choice priority scheme on either the resource side or the requester side.

The distributed approach described herein for the switch in FIG. 6 is equally applicable to systems requiring arbitration for resources such as the multiprocessor system illustrated in FIG. 2.

Referring to FIGS. 9A–9D and the program listing in Appendix C, which describes the operation of one embodiment of a sequential distributed arbiter, array R has a 1 in each position R[i,j] where requester i is requesting resource j. Assume that I,J=[1,0] initially. That results in an initial round robin position of R[1,0], which is shown in FIG. 9A. FIGS. 9A–9D show the resource RES and the number of requests for each requester shown as (requester:requests). As shown in procedure arbitrate in Appendix C, for each resource rs, procedure resource is called, which checks to see if the round robin position is asserted and if not, finds the requester with the highest priority. After a resource is allocated, procedure requester is called for each requester rq to recalculate the number of requests. Referring to FIG. 9A again, in which the arbitration for resource 0 is shown, the round robin position R[1,0] happens to be asserted and thus resource 0 is granted to requester 1. The circled position in array R indicates the round robin position. The "X" indicates the granted request. After resource 0 is allocated, the requests for requester 1 are zeroed out since that requester has been granted a resource, and the requesters recalculate their number of requests and resend their requests to the resources. The initial number of requests being made by the various requesters is also shown in FIG. 9A. In the embodiment illustrated in Appendix C and FIGS. 9A–9D, requests for a scheduled resource are no longer considered when recalculating the number of requests. That implies that grants are known by all requesters. In other embodiments, scheduled resources may be considered in recalculating the number of requests, when, e.g., grants are only known by the requester granted the resource. In other embodiments, it is also possible not to recalculate the number of requests at all.

While the requesters, in this embodiment, provide the number of requests as an indication of their priority, in another embodiment, the requesters may send a number directly indicative of their priority.

After the arbitration for resource 0 is completed the distributed arbiter arbitrates the requests for resource 1 as illustrated in FIG. 9B. The round robin position is incremented to be R[2, 1] as indicated by the circle in that position in array R. Since that position is false, the sequential distributed arbiter goes on to evaluate the other requests for resource 1. Requester 3 has the highest priority for resource 1 (NRQ=1 as opposed to NRQ=2 for requester 0) and is therefore granted its request as indicated by the X at R[3, 1].

After resource 1 is allocated, the requests for requester 3 are zeroed out since that requester has been granted a resource (resource 1) and the requesters recalculate their number of requests and resend their requests to the resources. The resulting calculations are shown in FIG. 9C.

Resource 2 is now allocated as shown in FIG. 9C. The round robin position is incremented to be R[3,2] as indicated by the circle in that position in array R. Since that position is false, the sequential distributed arbiter goes on to evaluate the other requests for resource 2. Requesters 0 and 2 have requests for resource 2. Since requester 0 has only one request as compared to two requests for requester 2, requester 0 is granted resource 2 as indicated by the X at R[0,2].

After resource 2 is allocated, the requests of requester 0 are zeroed out since that requester has been granted a resource (resource 2) and the requesters recalculate their number of requests and resend their requests to the resources. The resulting calculations are shown in FIG. 9D.

Resource 3 is now allocated as shown. The round robin position is incremented to be R[0,3] as indicated by the circle in that position in array R. Since that position is false, the sequential distributed arbiter goes on to evaluate the other requests for resource 3. Since requester 2 is the only requester, requester 2 is granted resource 3 as indicated by the X at R[2,3]. That completes an arbitration cycle for the resources. All the resources have been granted according to priority of the requesters or the round robin mechanism. Note that because the resources were allocated sequentially, none of the requesters received multiple grants during the arbitration cycle for the resources. While the particular implementation described in Appendix C and illustrated in FIGS. 9A–9D, have used a round robin scheme, any starvation avoidance scheme (or none at all) may be utilized depending on the system requirements.

Figure 10:
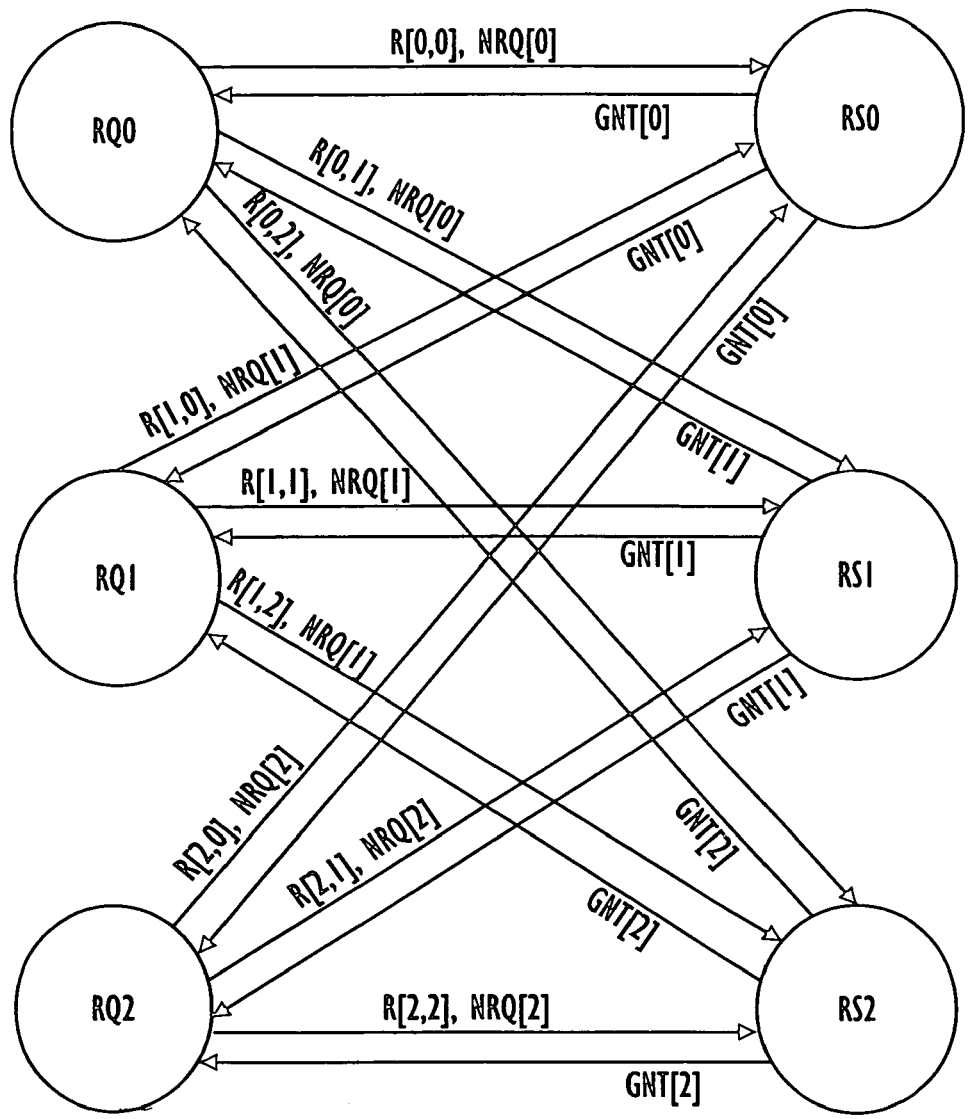
FIG. 10 illustrates data flow between requesters and resources in a distributed arbiter according to an embodiment of the invention.

FIG. 10 provides another view of a system utilizing a sequential distributed arbiter and illustrates the information flow between resources and requesters in an embodiment of a sequential distributed arbiter. FIG. 10 shows three requesters and three resources. In the illustrated embodiment, each requester (RQ0, RQ1, RQ2) sends to each resource (RS0, RS1, RS2) its requests R and its number of requests NRQ. For example, RQ0 sends requests R[0,0], R[0,1] and R[0,2] together with its number of requests NRQ [0] to resources RS0, RS1 and RS2, respectively. In one sequential arbiter embodiment, RS0 grants requests prior to RS1, which grants its requests prior to RS2. In that way, requests from requesters already granted a resource can be eliminated during sequential operations, thus ensuring that multiple grants are not supplied to requesters. In other sequential distributed arbiters, the order in which resources are allocated may be varied as explained further herein.

The number of requests function as the priority indication. Other embodiments may encode a priority indication differently. For example, the inverse of the number of requests may be sent.

The number of wires utilized in the embodiment shown in FIG. 10, assuming a separate wire is used for each transmission, is $n^2(\lceil \log_2(n+1) \rceil + 2)$, where n represents the number of resources (and assuming the system is symmetric in terms of the number of requesters and the number of resources). NRQ has values from 0..n; therefore, the number of values is n+1. Since NRQ only needs to be defined for R[i,j]=1, in which case it has values 1 . . . n, NRQ could be encoded such that the numbers of wires is $n^2(\lceil \log_2 n \rceil+2)$, where $\lceil x \rceil$ is defined as a ceiling function, e.g., $\lceil \log_2 7 \rceil=3$. Other implementations may use $\lceil \log_2(n+1) \rceil$ to encode NRQ. Thus, where n=3, the number of wires utilized is 36 for either implementation. That assumes that the request and grant utilize one wire each and the binary encoding of NRQ utilizes 2 wires. Thus, four wires connect each requester to each resource in the embodiment illustrated in FIG. 10.

There are many other ways to couple the resources and the requesters. Additional exemplary embodiments will be described. Generally, however, there is a trade off between space and time in designing the data paths that connect the requesters and the resources. If every signal has its own wire, and, as a result, the data path is not time multiplexed in any manner, arbitration time can be reduced to approximately the time taken by the resource to calculate the grants. For a sequential distributed arbiter, where every signal has its own wire, the time t to complete an arbitration cycle is a function of the size of the system, that is it is n times the time taken to calculate the grants for any one resource, where n is the number of resources. For a parallel distributed arbiter, which is discussed further herein, the time to complete an arbitration varies according to the number of arbitration iterations necessary to allocate the resources. As the number of wires are reduced, and the degree of multiplexing increases, the total arbitration time increases in both sequential and distributed arbiters. Various systems may make different space-time tradeoffs according to system requirements.

Referring to FIGS. 11A and 11B and the software listing in Appendix D, operation of a parallel distributed arbiter will now be described. In a parallel distributed arbiter, each resource calculates its grants in parallel with other resources.

An exemplary embodiment of a parallel distributed arbiter is described in Appendix D. Before an arbitration iteration, in which resources determine which requests to grant and requesters determine which grant to accept, the resources initialize their grants in procedure init_resource. All the requesters calculate their number of requests, which provides an indication of their priorities in procedure init_requester. A first iteration of the operation of the parallel distributed arbiter that is modeled in Appendix D, is provided in FIG. 11A. FIG. 11A shows the iteration number IT, the number of requests (NRQ) for each requester, which resource was granted to which requester in GNT, shown as (resource:requester), the number of requests for a resource (NRS) shown as (resource:requests) and finally the accepted grants (ACC) shown as (requester:resource). All the resources determine their grants simultaneously. That is modeled in the listing in Appendix D by calling procedure resource for each resource in parallel without the resources coordinating the granted requests and without any of the requesters recalculating their NRQs as was done in the sequential distributed arbiter illustrated in Appendix C.

The round robin mechanism used in Appendix D is similar to the ones described previously. Arbitration for each of the resources will be described with relation to FIG. 11A for iteration 0. Note that it is preferable, although not necessary, that the resources make their arbitration decisions in parallel.

Resource 0 sees two requests (NRS 0:2). However, since the round robin position indicated by a circle at position R[1,0] indicates a request, resource 0 grants requester 1 its request (GNT 0:1) as indicated by the square at position R[1,0]. There is no need to evaluate requests based on priority.

Note that the round robin positions are coordinated among the requesters as well as the resources in the embodiment shown. In other embodiments, the round robin positions are independently determined in each requester and resource. Other starvation avoidance mechanisms, e.g., a random selection prior to allocating a resource to requesters based on priority, may also be used in a parallel distributed arbiter. In another embodiment, a parallel distributed arbiter uses no starvation avoidance mechanism at all.

For resource 1, the round robin position is R[2, 1], which does not indicate a request. Therefore, resource 1 arbitrates requests based on priority as described in procedure resource in Appendix D. Resource 1 has two requests (NRS 1:2), from requester 1 and requester 3. Since requester 1 has four requests (NRQ 1:4) and requester 3 has two requests (NRQ 3:2), requester 3 has a higher priority and resource 1 grants requester 3 its request (GNT 1:3) as indicated by the square at position R[3,1].

For resource 2, the round robin position is R[3,2], which does not indicate a request. Therefore, resource 2 arbitrates requests based on priority as illustrated in procedure resource. Resource 2 has three requests (NRS 2:3), from requesters 0, 1 and 2. Requester 0 has one request (NRQ 0:1); requester 1 has four requests (NRQ 1:4); and requester 2 has three requests (NRQ 2:3). Resource 2 grants requester 0 its request (GNT 2:0) since it has a higher priority (lower NRQ) than the other requesters.

For resource 3, the round robin position is R[0,3], which does not indicate a request. Therefore, resource 3 arbitrates requests based on priority as described in procedure resource. Resource 3 has three requests (NRS 3:3), from requesters 1, 2 and 3. Requester 1 has four requests (NRQ 1:4); requester 2 has three requests (NRQ 2:3); and requester 3 has two requests (NRQ 3:2). Resource 3 grants requester 3 its request (GNT 3:3) since requester 3 has a higher priority (lower NRQ) than the other requesters.

Note that requester 2 was not granted any of its requests during iteration 0. Although no ties were illustrated in the examples given, in the event of a tie, many approaches can be used to break the tie, such as a round robin or random scheme.

Unlike the sequential arbiter, it is possible for requesters to receive multiple grants. That can be seen in FIG. 11A where requester 3 receives grants from resource 1 and from resource 3. Resource 3 therefore has to choose between two grants. That can be accomplished through a variety of mechanisms. A round robin scheme could be utilized. A random scheme could be employed. A priority scheme could also be utilized, alone or in conjunction with a starvation avoidance mechanism.

In the embodiment illustrated in FIG. 11A and described in appendix D, a round robin scheme is used in conjunction with an arbitration scheme accepting a grant based on the number of requests that were made for a particular resource. The requester selects as the highest priority grant, the grant from a resource with the fewest requests and thus accepts the grant from that resource.

The operation of such an embodiment is described in Appendix D and illustrated in FIG. 11A. Preferably, if time is important, the requesters determine their acceptances in parallel. Since requester 0 and 1 received only one grant each, they accept their respective grants. Since requester 2 has no grants to accept, it does not accept a grant. Because requester 3 received two grants, as indicated by the squares in R[3,1] and R[3,3]. Requester 3 uses an arbitration approach to decide which grant to accept. The arbitration approach selects as the highest priority grant, the grant coming from the resource with the fewest requests. Each of the resources, supplies to the requesters the number of requests received by the resource (NRS), along with a grant indication. Another indication of priority of the resources could also be supplied, e.g., the inverse of the number of requests. From FIG. 11A, it can be seen that resource 1 received two requests (NRS 1:2) and resource 3 received three requests (NRS 3:3). Thus, resource 1 has the highest priority and is accepted by requester 3. Requester 3 sends back an accept indication to resource 1 as indicated by the X at R[3, 1]. As illustrated in the program listing of procedure requester in Appendix D, each requester can also employ a starvation avoidance mechanism, such as round robin, prior to evaluating the grants based on priority. That ensures that a particular grant is guaranteed to be accepted within a predetermined amount of time if it is continually asserted. In one embodiment, all of the requesters that accepted a grant, clear their NRQs after the grants are accepted. That completes the first iteration of the parallel distributed arbiter. Note that only three of the four resources have had grants accepted.

A second iteration is illustrated in FIG. 11B. Because all of the requesters that accepted a grant in the previous iteration have cleared their NRQs, only requester 2 has a non-zero NRQ. Since resource 3 is the only resource whose grant was not accepted in the previous iteration, it is the only resource in procedure resource that evaluates requests again. The round robin position does not have to change during the iterations and in the operation of the distributed arbiter illustrated in Appendix D, the round robin position does not change. Because the round robin position is not asserted, resource 3 goes on to evaluate outstanding requests. As requester 2 is the only request that it has (R[2,3]), resource 3 supplies a grant to requester 2 (GNT 3:2) along with the number of requests resource two received. In this case, that number is 1 (NRS 3:1).

Requester 2 is the only requester that has not received a grant, and accepts the grant from resource 3. That completes the second iteration.

Figure 12:
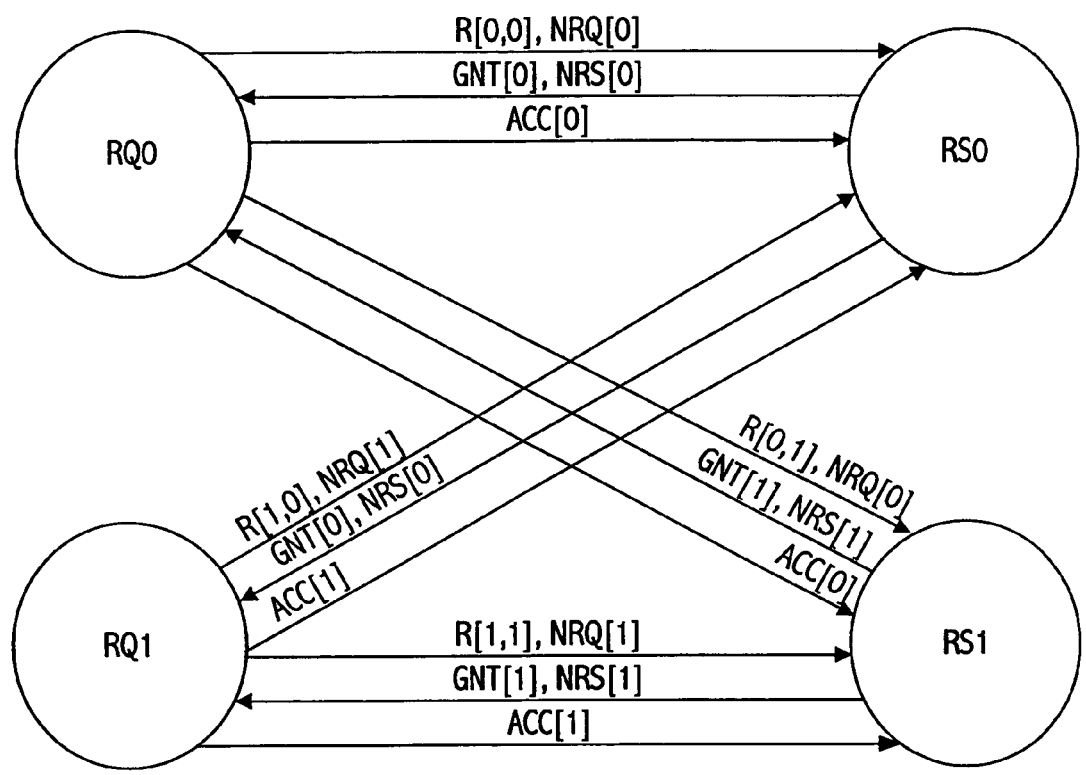
FIG. 12 illustrates data flow between requesters and resources in a parallel distributed arbiter according to an embodiment of the invention.

FIG. 12 provides another view of a system utilizing a parallel distributed arbiter and illustrates the information flow between resources and requesters in an embodiment of a parallel distributed arbiter. To simplify the figure, FIG. 12 shows only two requesters and two resources. In the illustrated embodiment, each requester (RQ0, RQ1) sends to each resource (RS0, RS1) its requests R and its number of requests NRQ. For example, RQ0 sends requests R[0,0] and R[0,1] to resources RS0 and RS1, respectively and NRQ [0] to both. In a parallel arbiter embodiment, the resources preferably evaluate their requests and provide their grants in parallel. Thus, a resource determines which request to grant generally independent of the other resources (the round robin positions may be coordinated). For that reason, a requester with multiple requests may get multiple grants.

The number of requests, NRQ, sent by each requester functions as the priority indication. Other embodiments may encode a priority indication differently. For example, the inverse of the number of requests may be sent. In another alternative, the requester may send a vector of requests as shown in FIG. 8, which each resource receives and from which each resource independently calculates a priority based on the number of requests.

In addition to sending grants, such as GNT[0], as did the sequential arbiter, each resource also sends its priority in the form of the number of requests it received, shown as NRS in FIG. 12. Again, the priority may be encoded as a number of requests, an actual priority, provided as a vector of requests or in any other manner suitable to inform the requester about the priority of the resource, if resource priority is used to determine which grant to accept. Finally, each requester sends an acceptance (ACC) back to resource.

There is more information transferred between the requesters and resources in the illustrated embodiment of the parallel distributed arbiter as compared to the sequential distributed arbiter illustrated in FIG. 10. Therefore, more wires are required in an embodiment illustrated in FIG. 12, assuming a separate wire is used for each transmission. For each connection providing information from a requester rq to a resource rs, the request (R[rq,rs]) requires one wire; the binary encoded number of requests (NRQ) requires $\lceil \log_2(n+1) \rceil$ wires, where n is the number of resources; the accept (ACC) requires one wire. For each connection providing information from a resource to a requester, the grant GNT requires one wire; and the binary encoded number of requests received by a resource (NRS) requires $\lceil \log_2(n+1) \rceil$ wires, where n is the number of requesters. For a system with n requesters and n resources, the total number of wires utilized is $n^2(2\lceil \log_2(n+1) \rceil+3)$.

There are many other ways to couple resources and requesters. Additional exemplary embodiments will be described. As previously stated, however, there is a trade off between space and time in designing the data paths that connect the requesters and the resources. If every signal has its own wire, and, as a result, the data path is not time multiplexed in any manner, arbitration time can be reduced to approximately the time taken by the resource to calculate the grants. For a parallel distributed arbiter, the time to complete an arbitration cycle varies according to the number of arbitration iterations taken to allocate the resources. Since a small number of iterations is sufficient to generate a nearly optimal schedule, the parallel distributed arbiter is potentially faster than the sequential distributed arbiter, particularly if the number of requesters and resources is large. As the number of wires are reduced, and the degree of multiplexing increases, the total arbitration time increases. Various systems may make different space-time tradeoffs according to system requirements.

Figure 13:
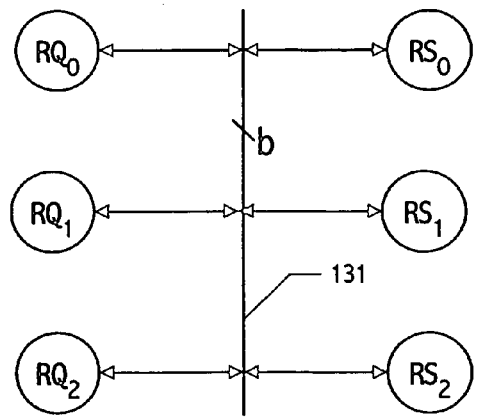
FIG. 13 illustrates a bus based distributed system suitable for using an embodiment of the invention.

In another embodiment of an arbitration system, rather than a switch model, generally illustrated in FIGS. 10 and 12, a bus based distributed arbiter may be implemented as shown in FIG. 13. Each requester $RQ_0$, $RQ_1$ and $RQ_2$ is coupled to the resources $RS_0$, $RS_1$ and $RS_2$ through a bus 131 of width b.

Figure 14:
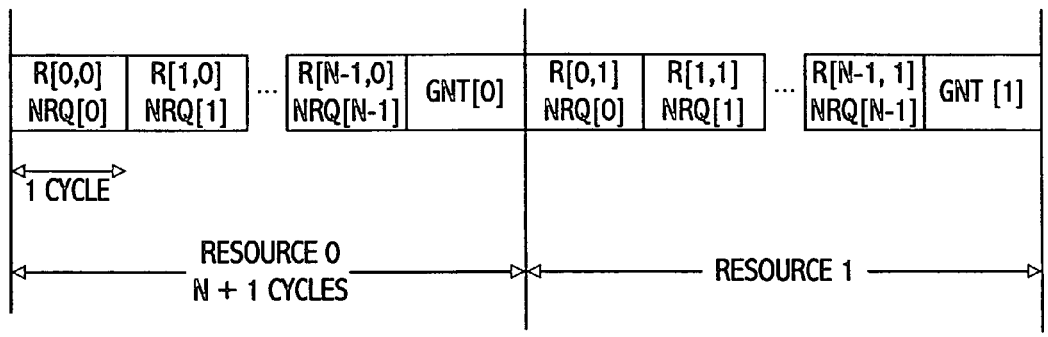
FIG. 14 illustrates the timing of operation of an embodiment of a sequential distributed arbiter utilizing a bus structure shown in FIG. 13.

Operation of a sequential bus based distributed arbiter is illustrated in FIG. 14. Requester $RQ_0$ places both its request for resource 0 R[0,0] and its priority (in terms of number of requests) NRQ[0] on bus 131. As shown in FIG. 14, that takes one cycle. Note the term cycle does not necessarily refer to a single bus clock. Rather, the term is intended to more generically refer to the amount of bus time that it takes to transfer a unit of information. On some buses that may be the amount of time to transfer a word across the bus. On other buses, the overhead for the information transfer involves more bus cycles. Assume that bus 131 is of a sufficient width to transport both NRQ ($\lceil \log_2(n+1) \rceil$) and requests (1 bit) in one "cycle". That assumes that the bus width b=$\lceil \log_2(n+1) \rceil$+1. during each subsequent cycle another requester rq places its request R[rq,0] for resource 0 and its priority (NRQ[rq]) on the bus. Once a resource has received all its requests, it grants one of the requests according to a least choice first approach in which requesters having the fewest requests are granted their requests first. In addition, a round robin scheme or other starvation avoidance scheme, as described herein, may be utilized. Thus, it takes the requesters, assuming n requesters, n cycles to place their information on the bus. The grant takes one cycle. The time to compute the grant is not shown. For each resource, the arbitration time, in terms of bus cycles is n+1 cycles. The arbitration time t for n resources is t=n X (n+1), which =$n^2$+n. If n=16, then t=272. If n=32, then t=1056. Because the arbitration time t is based on $n^2$, for large bus based systems, the sequential distributed arbiter may consume a lot of cycles.

Figure 15:
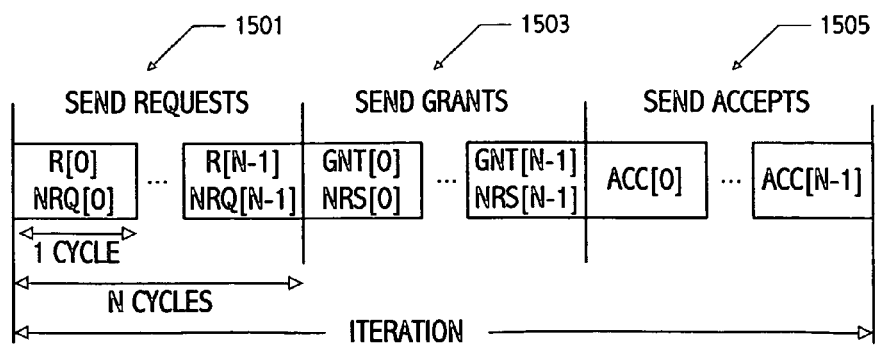
FIG. 15 illustrates the timing of operation of an embodiment of a parallel distributed arbiter utilizing a bus structure shown in FIG. 13.

A bus based system may also use a parallel distributed arbiter. Operation of a parallel distributed arbiter is illustrated in FIG. 15, which shows one iteration of a parallel distributed arbiter for n requesters and n resources. Each requester rq, sequentially sends out a vector R[rq] of requests indicating the resources it is requesting for the iteration and its number of requests NRQ[rq] during 1501. Assume the bus is wide enough to simultaneously supply the vector of requests and the number of requests from one requester. That requires $\lceil \log_2(n+1) \rceil$ wires for NRQ and n wires for the vector of requests. For 32 resources, that could take 32 vector bits and 6 bits for NRQs. For n requesters, that takes n cycles. If the bus is smaller, multiple bus cycles are needed for each requester. Each resource sends its grant and its number of received requests (NRS) during time period 1503 on the bus. Each resource consumes one cycle. For n resources, that takes n cycles. Again, the bus is assumed to be wide enough to support sending its grants (GNT, $\log_2(n)$ wires) along with the number of received requests (NRS, $\lceil \log_2(n+1) \rceil$ wires). If the bus is smaller, it will take extra bus cycles to transfer the information. Once the grants are received, each requester sends its accepts (ACC, $\log_2 n$ wires) on the bus during 1505. For n requesters that takes n cycles. So the total number of cycles to accomplish an iteration of the distributed arbiter operation illustrated in FIG. 15 is (3×n). If n=32 and the number of iterations required is 4, the arbitration cycle takes 384 cycles as compared to 1056 for the sequential distributed arbiter. That is a significant improvement over the sequential distributed arbiter. Thus, depending on the circumstances of a particular implementation, for large networks or where large numbers of requesters and resources are arbitrating, a parallel distributed arbiter may provide advantages in terms of time savings.

Figure 16A:
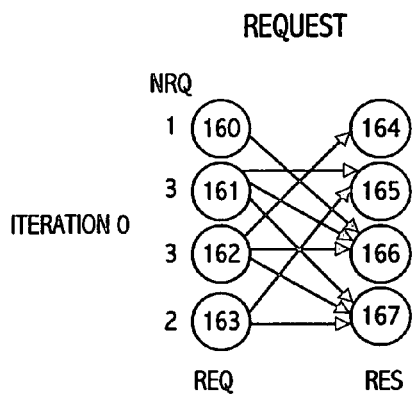
FIGS. 16A–16F illustrate another example of operation of an embodiment of a parallel distributed arbiter.
Figure 16B:
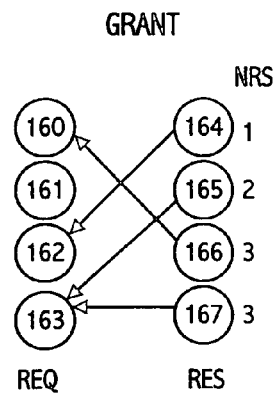

Referring to FIGS. 16A and 16B, another example of operation of a parallel distributed arbiter is shown. Referring to FIG. 16A, requesters 160, 161, 162 and 163 and are requesting resources 164, 165, 166 and 167. Requester 160 has one request for resource 166. Requester 161 has three requests, for resources 165, 166 and 167. Requester 162 has three requests for resource 164, 166 and 167. Requester 163 has two requests, for resource 165 and resource 167.

Referring to FIG. 16B, the resources grant the requests as follows. Resource 164 provides a grant to its single requester 162. For resource 165, requester 163 has fewer requests than requester 161 and therefore the highest priority. Therefore, resource 165 grants requester 163 its request. Resource 166 grants requester 160, with only one request, its request. Finally, resource 167 grants requester 163 its request, since it was the requester with the fewest requests. Thus, at the end of the grant phase shown in FIG. 16B, requesters 160 and 162 have received one grant and requester 163 has received two grants.

Figure 16C:
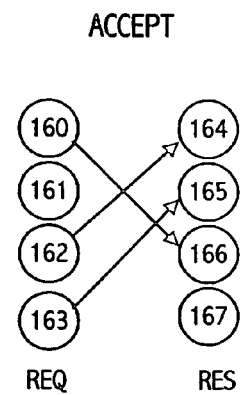

During the accept phase shown in FIG. 16C, requesters 160 and 162 send accepts in response to their one received grant. Requester 163 accepts the grant from resource 165 since resource 165 had received two requests as opposed to the three requests received by resource 167, and thus resource 165 had the highest priority. At the end of the first iteration, all the requesters except 161 have accepted grants.

Figure 16D:
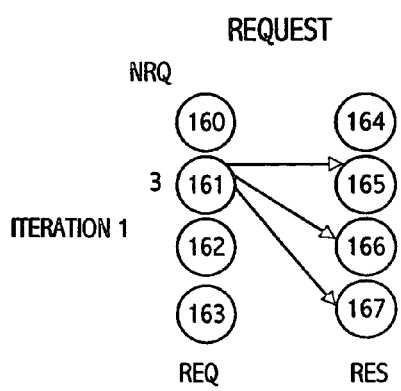
Figure 16E:
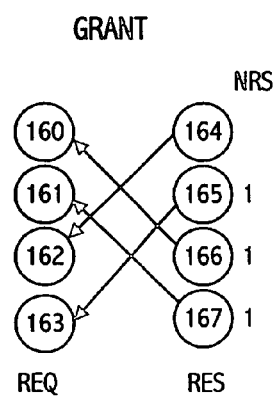
Figure 16F:
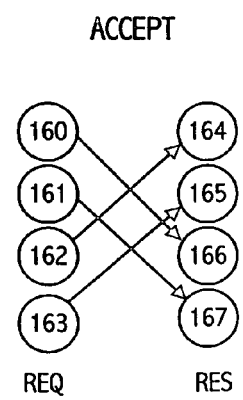

The second iteration is shown in FIGS. 16D–16F, where requester 161 resends its three requests in FIG. 16D. FIG. 16E shows the grant sent by resource 167 to requester 161 (along with the previously sent grants). FIG. 16F shows the accept sent from requester 161 to resource 167 (along with the previously sent accepts). Thus, two iterations have completely allocated all the resources. In general, two to four iterations are sufficient to provide close to optimal allocation of resources. For n=32, four iterations has provided good results. Note that a starvation avoidance mechanism was not illustrated in FIGS. 16A–16F.

While the number of iterations during each arbitration cycle may be fixed in certain embodiments, in other embodiments, the number of iterations may be varied dynamically to respond to such factors as an estimation of how optimal the scheduling is, or loading conditions. For example, if a requester receives large numbers of grants, that may suggest sub-optimal scheduling since only one grant is accepted leaving the resources with the other grants unallocated. On the other hand, if resources stop changing grants, no more iterations are needed.

There are numerous variations that can be made to the embodiments described herein. For example, the transmission of the grants can be omitted if each requester is able to calculate all grant values. That implies that the resources and requesters are synchronized in regards to round robin positions. Assume that each requester is also a resource and thus forms a requester/resource pair. For example, if a requester is assumed to be a node on a network, that node is also likely to be a resource. For each resource or requester to calculate all grant values, it means that each requester/resource pair receives all requests, which may take the form of the request vectors illustrated in FIG. 8 or shown operationally in FIG. 15.

Other variations are possible. For example, the transmission of the NRQ[0 . . . n−1] may be omitted if the resources are able to calculate those values based on the requests sent by the requesters. For example, if the requesters transmit the requests in n cycles, R[0, 0 . . . n−1] in the first cycle, R[1, 0 . . . n−1] in the second cycle, etc. The resources can, from that information, calculate NRQ and subsequently GNT and that reduces the transmission time from 3n to n cycles. Note that the variations tend to increase state and complexity of the resources.

In another embodiment the sequential distributed arbiter, rather than scheduling the resources in a fixed order, uses NRS[0 . . . n−1] to determine the order. That is, the resources are scheduled in order of priority.

While the embodiments have indicated the number of requester requests (NRQ) and number of received requests by a resource (NRS) are updated during the arbitration cycle, it is also possible to not update those values. That is true for both parallel and sequential distributed arbiter embodiments.

Figure 17:
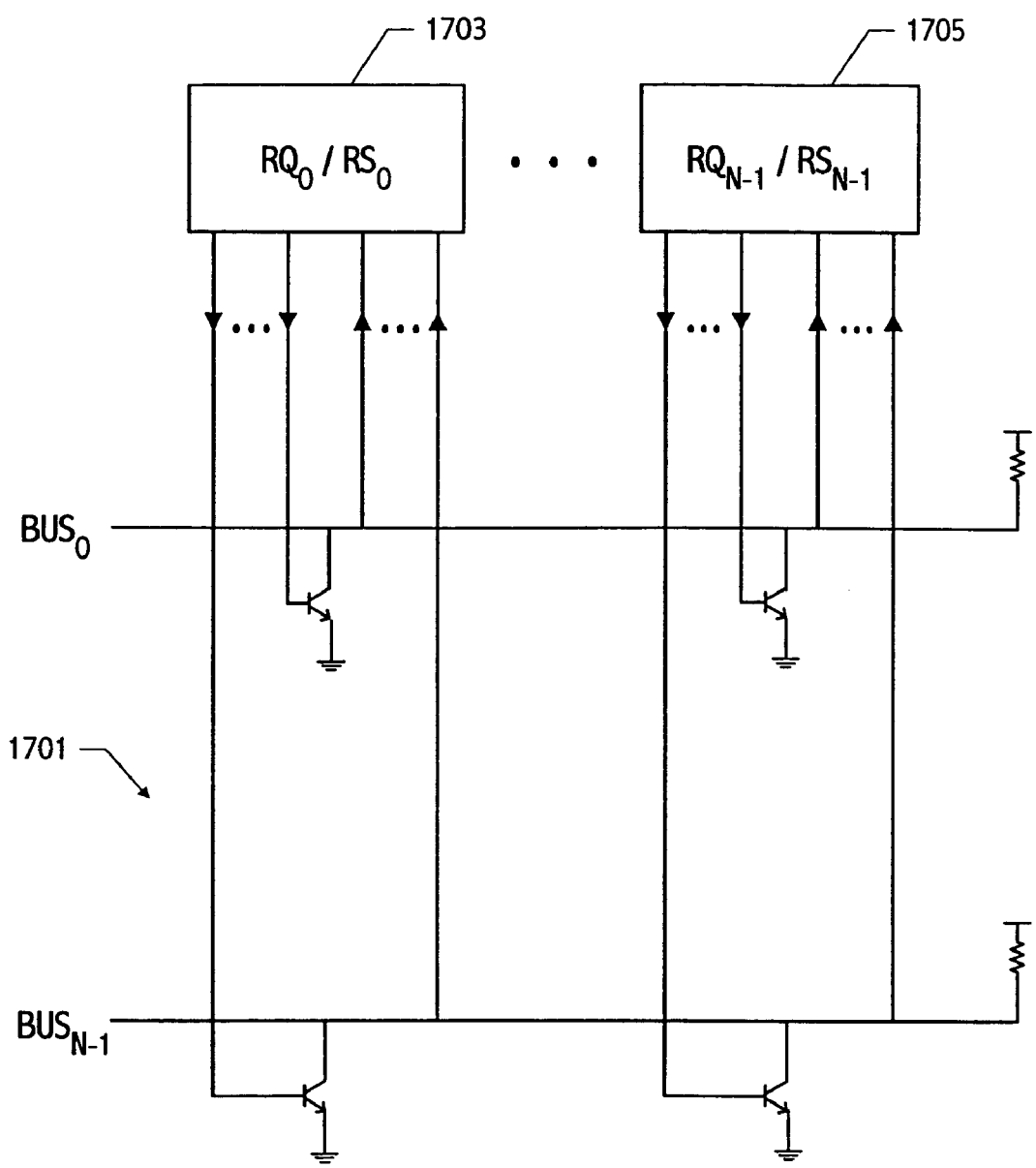
FIG. 17 illustrates an open collector bus structure for resolving priority in a distributed arbiter.

Referring to FIG. 17, in another implementation, an open collector bus structure 1701 is used to calculate the minimum of NRQ[0], . . . , NRQ[n−1], that is, to determine the requesters with the highest priority. In this implementation the requester/resource pairs 1703–1705 ($RQ_0/RS_0$ through $RQ_{n-1}/RS_{n-1}$), encode NRQ as a unary encoded message. All of the requesters send their NRQs simultaneously. The open collector bus 1701 sees the wired-NOR of all the NRQs. The result of the wired-NOR is the inverted value of the highest priority requester. For example, assume requester 1703 has priority 4. That is encoded onto bus 1701 as "0 . . . 01111". Assume another requester has priority-2, which is encoded onto bus 1701 as "0 . . . 00011". Assume those are the only two requesters with requests. The wired-NOR of those two values is "1 . . . 10000". One way to use this information is to have requesters with lower priority remove their requests and have the resource choose one of the remaining "highest priority" requests to grant. That is, resources only receive requests from the highest priority requesters. That way, there is no need to determine which requester is highest priority.

As would be readily apparent to those of skill in the art, there are many ways to modify the bus structure of 1701. For example, each requester may put the inverse of its NRQs on the bus and wire-NOR those together. For example, assume requester 1703 has four requests (NRQ[0]=4). That is encoded onto bus 1701 as "1 . . . 10000". Assume another requester has two requests (NRQ[n]="1 . . . 11100". Assume those are the only two requesters with requests. The wired-NOR of those two values is "0 . . . 00011", which represents a requester with two requests, the highest priority requester. The requesters see that any requester with more than two requests should withhold requests for the resource to be allocated.

After the open collector bus "arbitration", the requester(s) having the highest priority send their requests to the resource being scheduled. The resource knows that all requests received have equal priority and therefore the resource grants a request according to a round robin, random or other scheme to prevent starvation if there is more than one requester (which necessarily have the same priority).

Thus, an arbiter has been described that achieves high aggregate usage of the resources while still providing a minimum level of fairness, mainly in the sense that starvation of individual requests is prevented. The arbiter makes decisions based on granting resources according to a number of requests made by a requester, number of requests made for a resource or a combination of the two. The approach described herein can be utilized in a centralized arbitration scheme or in a distributed arbitration scheme. Referring to FIGS. 18A and 18B, those two approaches are respectively illustrated again in block diagram form.

There are several differences between the centralized and distributed arbitration approaches described herein. Typically, each of the requesters and resources in both the centralized and distributed arbitration schemes, where the arbiter is being utilized to allocate ports of a switching network, are on line cards or network interface cards. The line cards are coupled to the switch fabric 1801. However, in the centralized arbitration approach, the centralized arbiter is typically included on the board that includes the switch fabric. In the distributed approach, the distributed arbiters are located on the various line or network interface cards. Thus, a distributed approach provides the advantage of modularization over the centralized approach. That decentralization provides for increased fault tolerance, as a failure in an arbiter would not tend to bring the whole switch down. In addition, for a very large switch, e.g., 128 ports or greater, wiring problems due to the large number of ports may also make a centralized approach undesirable. Further, with a large switch, the parallel distributed approach has advantages over the sequential distributed arbiter since the arbitration time is proportional to the number of iterations (where the number of iterations typically is $\log_2$(number of resources)) rather than the number of resources.

The description of the invention set forth herein is illustrative, and is not intended to limit the scope of the invention as set forth in the following claims. The various embodiments may be used in various combinations with each other not particularly described. For instance, various of the starvation avoidance approaches described herein may be used in the distributed scheme. Note also that the sequential approach described herein can also be utilized by a centralized distributed arbiter. Further, the software described herein is used solely to describe operation of the system and many other data structures and hardware and software solutions can be implemented based on the teachings herein. Those and other variations and modifications of the embodiments disclosed herein, may be made based on the description set forth herein, without departing from the scope and spirit of the invention as set forth in the following claims.

APPENDIX A

```
1   var
2       I: 0..MaxReq-1;                              (* current round-robin requester offset *)
3       J: 0..MaxRes-1;                              (* current round-robin resource offset *)
4       req: 0..MaxReq-1;                            (* requester *)
5       res, r: 0..MaxRes-1;                         (* resource *)
6       gnt: -1..MaxReq-1;                           (* granted request *)
7       min: 0..MaxRes+1;                            (* minimum number of requests *)
8       R: array [0..MaxReq-1, 0..MaxRes-1] of boolean; (* R[i,j] says whether requester i is requesting resource j *)
9       nrq: array [0..MaxReq-1] of 0..MaxRes;       (* number of resources requested by a requester *)
10      S: array [0..MaxReq-1] of -1..MaxRes;        (* S[i] contains the granted request for requester i;
11                                                      if it contains -1, no request was granted *)
12  procedure arbitrate;
13  begin
14      for req := 0 to MaxReq-1 do
15      begin
16          S[req] := -1;                            (* initialize schedule *)
17          nrq[req] := 0;
18          for res := 0 to MaxRes-1 do
19              if R[req,res] then nrq[req] := nrq[req]+1; (* calculate number of requests for each requester *)
20      end;
21      for res := 0 to MaxRes-1 do                  (* allocate resources one after the other *)
22      begin
23          gnt := -1;
24          if R[(I+res) mod MaxReq,(J+res) mod MaxRes] then(* round-robin position wins *)
25              gnt := (I+res) mod MaxReq
```

APPENDIX A-continued

```
26          else                                            (* find requester with smallest number of requests *)
27          begin
28              min := MaxRes+1;
29              for req := 0 to MaxReq-1 do
30              begin
31                  if (R[(req+I+res) mod MaxReq,(res+J) mod MaxRes]) and (nrq[(req+I+res) mod MaxReq] < min) then
32                  begin
33                      gnt := (req+I+res) mod MaxReq;
34                      min := nrq[(req+I+res) mod MaxReq];
35                  end;
36              end;
37          end;
38          if gnt <> -1 then
39          begin
40              S[gnt] := (res+J) mod MaxRes;
41              for r := 0 to MaxRes-1 do R[gnt, r] := false;
42              nrq[gnt] := 0;
43              for req := 0 to MaxReq-1 do
44                  if R[req, (res+J) mod MaxRes] then nrq[req] := nrq[req]-1;
45          end;
46      end;
47      I := (I+1) mod MaxReq;
48      if I = 0 then J := (J+1) mod MaxRes;
49  end;
```

APPENDIX B

```
1   var
2       I: 0..MaxReq-1;                                     (* current round-robin requester offset *)
3       J: 0..MaxRes-1;                                     (* current round-robin resource offset *)
4       req: 0..MaxReq-1;                                   (* requester *)
5       res, r: 0..MaxRes-1;                                (* resource *)
6       gnt: -1..MaxReq-1;                                  (* granted request *)
7       min: 0..MaxRes+1;                                   (* minimum number of requests *)
8       R: array [0..MaxReq-1, 0..MaxRes-1] of boolean;     (* R[i,j] says whether requester i is requesting resource j *)
9       nrq: array [0..MaxReq-1] of 0..MaxRes;              (* number of resources requested by a requester *)
10      S: array [0..MaxReq-1] of -1..MaxRes;               (* S[i] contains the granted request for requester i;
11                                                             if it contains -1, no request was granted *)
12  procedure arbitrate;
13  begin
14      for req := 0 to MaxReq-1 do
15      begin
16          S[req] := -1;                                   (* initialize schedule *)
17          nrq[req] := 0;
18          for res := 0 to MaxRes-1 do                     (* calculate number of requests for each requester *)
19              if R[req,res] then nrq[req] := nrq[req]+1;
20      end;
21      for res := 0 to MaxRes-1 do                         (* check round-robin positions first *)
22          if R[(I+res) mod MaxReq,(res+J) mod MaxRes] then
23          begin
24              gnt := (I+res) mod MaxReq;
25              S[gnt] := (res+J) mod MaxRes;
26              for r := 0 to MaxRes-1 do R[gnt, r] := false;
27              for req := 0 to MaxReq-1 do R[req, (res+J) mod MaxRes] := false;
28          end;
29      for res := 0 to MaxRes-1 do                         (* allocate remaining resources 'least choice first' *)
30      begin
31          gnt := -1;
32          min := MaxRes+1;
33          for req := 0 to MaxReq-1 do                     (* find requester with smallest number of requests *)
34          begin
35              if (R[(req+I+res) mod MaxReq,(res+J) mod MaxRes]) and (nrq[(req+I+res) mod MaxReq] < min) then
36              begin
37                  gnt := (req+I+res) mod MaxReq;
38                  min := nrq[(req+I+res) mod MaxReq];
39              end;
40          end;
41          if gnt <> -1 then
42          begin
43              S[gnt] := (res+J) mod MaxRes;
44              for r := 0 to MaxRes-1 do R[gnt, r] := false;
45              nrq[gnt] := 0;
46              for req := 0 to MaxReq-1 do
47                  if R[req, (res+J) mod MaxRes] then nrq[req] := nrq[req]-1;
48          end;
49      end;
```

APPENDIX B-continued

```
50      I := (I+1) mod MaxReq;
51      if I = 0 then J := (J+1) mod MaxRes;
52  end;
```

APPENDIX C

```
1   var
2       I: 0..MaxRq-1;                              (* round-robin requester offset *)
3       J: 0..MaxRs-1;                              (* round-robin resource offset *)
4       rq: 0..MaxRq-1;                             (* requester *)
5       rs, r: 0..MaxRs-1;                          (* resource *)
6       gnt: -1..MaxRq-1;                           (* granted request *)
7       min: 0..MaxRs+1;                            (* minimum number of requests *)
8       R: array [0..MaxRq-1, 0..MaxRs-1] of boolean;   (* R[i,j] is true if requester i is requesting resource j *)
9       NRq: array [0..MaxRq-1] of 0..MaxRs;        (* NRq[i] is the number of resources requested by requester i *)
10      Gnt: array [0..MaxRs-1] of -1..MaxRq;       (* Gnt[i] contains grant for requester i *)
11
12  procedure arbitrate;
13
14  procedure init_resource;
15  begin
16      for rs := 0 to MaxRs-1 do                   (* initialize Gnt *)
17          Gnt[rs] := -1;
18  end; (* init_resource *)
19
20  procedure init_requester;
21  begin
22      for rq := 0 to MaxRq-1 do                   (* requesters calculate their priorities *)
23      begin
24          NRq[rq] := 0;
25          for rs := 0 to MaxRs-1 do
26              if R[rq, rs] then
27                  NRq[rq] := NRq[rq] + 1;
28      end;
29  end; (* init_requester *)
30
31  procedure resource;
32  (* input: rs,                                               *)
33  (*              R[0..MaxRq-1, (J+rs) mod MaxRs],            *)
34  (*              NRq[0..MaxRq-1];                            *)
35  (* output: Gnt[(J+rs) mod MaxRs];                           *)
36  begin
37      gnt := -1;
38      if R[(I+rs) mod MaxRq, (J+rs) mod MaxRs] then    (* check round-robin position first *)
39          gnt := (I+rs) mod MaxRq
40      else
41      begin
42          min := MaxRs + 1;                       (* find requester with highest priority *)
43          for rq := 0 to MaxRq-1 do
44              if R[(rq+I+rs) mod MaxRq, (J+rs) mod MaxRs] and (NRq[(rq+I+rs) mod MaxRq] < min) then
45              begin
46                  gnt := (rq+I+rs) mod MaxRq;
47                  min := NRq[gnt];
48              end;
49      end;
50      if gnt <> -1 then
51          Gnt[(rs+J) mod MaxRs] := gnt;
52  end; (* resource *)
53
54  procedure requester;
55  (* input: rq,                                               *)
56  (*              rs;                                         *)
57  begin
58      if Gnt[(rs+J) mod MaxRs] <> -1 then
59          for r := 0 to MaxRs-1 do                (* clear requests of scheduled requester *)
60              R[Gnt[(rs+J) mod MaxRs], r] := false;
61      NRq[rq] := 0;                               (* requesters calculate their priorities *)
62      for r := rs+1 to MaxRs-1 do                 (* only consider resources that have not yet been scheduled *)
63          if R[rq, (r+J) mod MaxRs] then
64              NRq[rq] := NRq[rq] + 1;
65  end; (* requester *)
66
67  begin (* arbitrate *)
68      init_resource;
69      init_requester;
70      for rs := 0 to MaxRs-1 do                   (* schedule resources sequentially *)
```

APPENDIX C-continued

```
71      begin
72          resource;
73          for rq := 0 to MaxRq-1 do
74              requester;                          (* requesters update priorities; clear requests when scheduled *)
75          end;
76          I := (I+1) mod MaxRq;                   (* update offsets for round-robin position *)
77          if I = 0 then J := (J+1) mod MaxRs;     (* each requester and resource has its own synchronized copy *)
78      end; (* arbitrate *)
```

APPENDIX D

```
1    var
2        I: 0..MaxRq-1;                                     (* round-robin requester offset *)
3        J: 0..MaxRs-1;                                     (* round-robin resource offset *)
4        rq: 0..MaxRq-1;                                    (* requester *)
5        rs: 0..MaxRs-1;                                    (* resource *)
6        gnt: -1..MaxRq-1;                                  (* granted request *)
7        acc: -1..MaxRs-1;                                  (* accepted request *)
8        it: 0..MaxIt-1;                                    (* iteration *)
9        min: 0..MaxRs+1;                                   (* minimum number of requests *)
10       R: array [0..MaxRq-1, 0..MaxRs-1] of boolean;      (* R[i,j] is true if requester i is requesting resource j *)
11       NRq: array [0..MaxRq-1] of 0..MaxRs;               (* NRq[i] is the number of resources requested by requester i *)
12       NRs: array [0..MaxRs-1] of 0..MaxRq;               (* NRs[i] is the number of requests received by resource i *)
13       Gnt: array [0..MaxRs-1] of -1..MaxRq;              (* Gnt[i] contains grant sent by resource i *)
14       Acc: array [0..MaxRq-1] of -1..MaxRs;              (* Acc[i] contains grant accepted by requester i *)
15
16   procedure arbitrate;
17
18   procedure init_resource;
19   begin
20       for rs := 0 to MaxRs-1 do                          (* initialize Gnt *)
21           Gnt[rs] := -1;
22   end; (* init_resource *)
23
24   procedure init_requester;
25   begin
26       for rq := 0 to MaxRq-1 do                          (* initialize Acc *)
27           Acc[rq] := -1;
28       for rq := 0 to MaxRq-1 do                          (* requesters calculate their priorities *)
29       begin
30           NRq[rq] := 0;
31           for rs := 0 to MaxRs-1 do
32               if R[rq, rs] then
33                   NRq[rq] := NRq[rq] + 1;
34       end;
35   end; (* init_requester *)
36
37   procedure resource;
38   (* input: rs,                                                     *)
39   (*            R[0..MaxRq-1, (J+rs) mod MaxRs],                    *)
40   (*            NRq[0..MaxRq-1],                                    *)
41   (*            Acc[0..MaxRq-1];                                    *)
42   (* output: Gnt[(J+rs) mod MaxRs],                                 *)
43   (*            NRs[(J+rs) mod MaxRs];                              *)
44   begin
45       if (Gnt[(J+rs) mod MaxRs] = -1) or (Acc[Gnt[(J+rs) mod MaxRs]] <> (J+rs) mod MaxRs) then
46           if R[(I+rs) mod MaxRq, (J+rs) mod MaxRs] then  (* check round-robin position first *)
47               Gnt[(J+rs) mod MaxRs] := (I+rs) mod MaxRq
48           else
49           begin
50               gnt := -1;
51               min := MaxRs + 1;                          (* find requester with highest priority *)
52               for rq := 0 to MaxRq-1 do
53                   if R[(rq+I+rs) mod MaxRq, (J+rs) mod MaxRs] and (NRq[(rq+I+rs) mod MaxRq] < min) then
54                   begin
55                       gnt := (rq+I+rs) mod MaxRq;
56                       min := NRq[(rq+I+rs) mod MaxRq];
57                   end;
58               if gnt <> -1 then
59                   Gnt[(J+rs) mod MaxRs] := gnt;
60           end;
61       NRs[(J+rs) mod MaxRs] := 0;
62       for r := 0 to MaxRq-1 do                           (* calculate resource's priority *)
63           if R[r, (J+rs) mod MaxRs] then
64               NRs[(J+rs) mod MaxRs] := NRs[(J+rs) mod MaxRs] + 1;
65   end; (* resource *)
```

APPENDIX D-continued

```
66
67     procedure requester;
68     (* input: rq,                                                   *)
69     (*              Gnt[0..MaxRs-1],                                *)
70     (*              NRs[0..MaxRs-1];                                *)
71     (* output: Gnt[(J+rs) mod MaxRs],                               *)
72     (*              R[(I+rs) mod MaxRq, 0..MaxRs-1],                *)
73     (*              NRq[(I+rs) mod MaxRq],                          *)
74     (*              Acc[(I+rs) mod MaxRq];                          *)
75     begin
76         acc := -1;
77         for rs := 0 to MaxRs-1 do                    (* accept round-robin position *)
78             if (rq = ((I+rs) mod MaxRq)) and (Gnt[(J+rs) mod MaxRs] = rq) then
79                 acc := (J+rs) mod MaxRs;
80         if acc = -1 then                             (* find resource with highest priority *)
81         begin
82             min := MaxRq + 1;
83             for rs := 0 to MaxRs-1 do
84                 if Gnt[(J+rs) mod MaxRs] = rq then
85                     if NRs[(J+rs) mod MaxRs] < min then
86                     begin
87                         acc := (J+rs) mod MaxRs;
88                         min := NRs[acc];
89                     end;
90         end;
91         if acc <> -1 then
92         begin
93             Acc[rq] := acc mod MaxRs;
94             for rs := 0 to MaxRs-1 do                (* clear requests of scheduled requester *)
95                 R[rq, rs] := false;
96         end;
97         NRq[rq] := 0;
98         for r := 0 to MaxRs-1 do                     (* requesters calculate their priorities *)
99             if R[rq, r] then
100                NRq[rq] := NRq[rq] + 1;
101    end; (* requester *)
102
103    begin (* arbitrate *)
104        init_resource;
105        init_requester;
106        for it := 0 to MaxIt-1 do
107        begin
108            for rs := 0 to MaxRs-1 do                (* each resource calculates a grant *)
109                resource;                            (* resources operate in parallel *)
110            for rq := 0 to MaxRq-1 do                (* each requester accepts a grant *)
111                requester;                           (* requesters operate in parallel *)
112        end;
113        I := (I+1) mod MaxRq;                        (* update offsets for round-robin position *)
114        if I = 0 then J := (J+1) mod MaxRs;          (* each requester and resource has its own synchronized copy *)
115    end; (* arbitrate *)
```

What is claimed is:

1. A method comprising:
   receiving at one resource of a plurality of resources, requests for the one resource from a plurality of requesters;
   granting the one resource to one of the requesters according to respective requester priorities, the respective requester priorities being inversely related to a number of requests made respectively, by the requesters; and
   the requesters supplying respective requester priority indications to at least the one resource.

2. The method as recited in claim 1 wherein requesters respectively supply number of requests as requester priority indications.

3. The method as recited in claim 1 further comprising granting at least one of the plurality of resources to a requester according to a round robin scheme, thereby avoiding starvation.

4. The method as recited in claim 1 wherein the one resource provides a grant indication to the one of the plurality of requesters.

5. The method as recited in claim 1 wherein the multiple plurality of resources evaluate received requests sequentially.

6. The method as recited in claim 5 wherein resources are considered in an order determined according to resource priority.

7. The method as recited in claim 1 wherein the plurality of resources evaluate received requests sequentially, and wherein a requester already granted a resource removes requests for other resources for arbitration for a next sequential resource, thereby preventing requesters from receiving multiple grants during an arbitration cycle.

8. The method as recited in claim 1 wherein requester priorities are recalculated after a resource is granted.

9. The method as recited in claim 8 further comprising requesters recalculating their requests by eliminating requests for a granted resource.

10. The method as recited in claim 1 further comprising performing multiple iterations during one arbitration cycle to allocate resources to requesters.

11. The method as recited in claim 1 wherein the resources do not transmit grant indications to requesters, each requester determining grant values according to received information from other requesters.

12. The method as recited in claim 11 wherein requesters and resources are synchronized in regards to round robin positions.

13. The method as recited in claim 1 wherein each of the requesters provides an indication of priority on a bus logically combining the indications of priority, the priority being related to a number of requests being made by each of the requesters.

14. The method as recited in claim 13 wherein the indications of priority are unary coded, one bit corresponding to one request.

15. The method as recited in claim 14 wherein the bus logically combines the indications of priority.

16. The method as recited in claim 14 wherein the indications of priority are a number of requests of respective requesters.

17. The method as recited in claim 14 further comprising a requester responding to the priority indication on the bus by not sending a request if the priority indication on the bus indicates a higher priority requester is requesting a resource.

18. The method as recited in claim 1 wherein the requesters are nodes of a network coupled to input ports of a network switch and the resources are output ports of the network switch, multiple ones of the output ports being accessible to more than one of the input ports.

19. The method as recited in claim 1 wherein the requesters are processors of a multi-processor system and the resources are memories coupled to the processors, each of the memories being accessible to more than one of the processors.

20. The method as recited in claim 1 further comprising recalculating requester priorities after each time a resource is granted to a requester.

21. A method comprising:
receiving at one resource of a plurality of resources, requests for the one resource from a plurality of requesters; and
granting the one resource to one of the requesters according to respective requester priorities, the respective requester priorities being inversely related to a number of requests made respectively, by the requesters,
wherein the one resource sends a resource priority indication to the requester being granted its request, indicative of a number of requests received by the resource, and
wherein requesters receive multiple grants from multiple resources during an arbitration iteration.

22. The method as recited in claim 21 wherein a number of arbitration iterations over multiple arbitration cycles varies dynamically.

23. The method as recited in claim 21 wherein the one resource determines which requests to grant in parallel with other resources determining which requests to grant.

24. The method as recited in claim 21 wherein the one resource sends a grant indication to a requester being granted its request.

25. The method as recited in claim 21 wherein the requester being granted its request sends an accept indication to the resource whose grant it is accepting.

26. The method as recited in claim 25 wherein a requester determines which of one or more grants to accept, in parallel with other requesters determining which received grants to accept.

27. A method comprising:
receiving at one resource of a plurality of resources, requests for the one resource from a plurality of requesters; and
granting the one resource to one of the requesters according to respective requester priorities, the respective requester priorities being inversely related to a number of requests made respectively, by the requesters, wherein requesters receive multiple grants from multiple resources during an arbitration iteration and
wherein a requester selects from among a plurality of grants according to respective resource priorities associated with each granting resource, the respective resource priorities being inversely related to a number of requests made, respectively, for each granting resource.

28. The method as recited in claim 27 wherein resource priorities are recalculated each iteration.

29. The method as recited in claim 27 wherein requester priorities are recalculated each iteration.

30. The method as recited in claim 27 further comprising the requester utilizing a round robin scheme to select from among the plurality of grants.

31. The method as recited in claim 30 wherein the round robin scheme is utilized before the requester selects from among the plurality of grants according to the respective resource priorities, the requester selecting from among the plurality of grants according to the respective resource priorities if the round robin scheme does not result in an acceptance of a grant.

32. The method as recited in claim 27 further comprising the requester utilizing a random scheme in addition to using calculated priorities to select from among the plurality of grants.

33. An arbitration apparatus for arbitrating requests from a plurality of requesters for a plurality of resources, comprising:
means for receiving requests for resources from the requesters;
means for granting requests according to requester priorities, the requester priorities being inversely related to the number of requests respectively made by the requesters;
means for selecting from among a plurality of grants according to resource priorities, the resource priorities being inversely related to the number of requests made for the respective resource.

34. The arbitration apparatus as recited in claim 33 further comprising means for preventing starvation for grants.

35. The arbitration apparatus as recited in claim 33 further comprising means for preventing starvation for requests.

36. The arbitration apparatus as recited in claim 33 wherein the arbitration apparatus is one of a distributed arbiter and a centralized arbiter.

37. The arbitration apparatus as recited in claim 33 further comprising:
means for logically combining indications of priority, the priority being related to a number of requests being made by each of the requesters.

38. A distributed arbiter comprising:
a plurality of requesters;
a plurality of resources coupled to the requesters through a transport mechanism;
wherein each requester is coupled to provide to each resource requested by the respective requester, a request indication;

wherein a requested resource is responsive to a plurality of requests to selectively grant one of the requests according to requester priorities, the requester priorities being inversely related to a number of requests being made by respective requesters; and wherein the requested resource is further coupled to provide an indication of resource priority, the resource priority being inversely related to a number of resource requests received by the requested resource.

39. The distributed arbiter as recited in claim 38 wherein the requested resource is further responsive to the plurality of requests to selectively grant one of the requests according to a round robin mechanism.

40. The method as recited in claim 39 wherein the round robin mechanism is utilized before the requested resource selects from among the plurality of requests according to the requester priorities, the requested resource granting one of the requests according to the requester priorities if the round robin mechanism does not result in a grant.

41. The distributed arbiter as recited in claim 38 wherein each requester requesting the requested resource respectively provides a requester priority indication to the requested resource.

42. The distributed arbiter as recited in claim 41 further comprising a bus coupled to the requesters and resources, and wherein each of the requesters provides an indication of priority on a bus, the bus logically combining the indications of priority, the priority being inversely related to a number of requests being made by each of the requesters.

43. The distributed arbiter as recited in claim 42 wherein the indications of priority are unary coded.

44. The distributed arbiter as recited in claim 42 wherein a bus implements a wired-NOR of the indications of priority.

45. The distributed arbiter as recited in claim 42 wherein each requester places a unary encoded number of requests on the bus as the indication of priority.

46. The method as recited in claim 42 wherein a requester with a lower priority than indicated on the bus is responsive to the priority indicated on the bus to not send its request to a resource.

47. The distributed arbiter as recited in claim 38 wherein the requested resource provides a grant indication to a requester whose request is being granted by the resource.

48. The distributed arbiter as recited in claim 38 wherein a requester is responsive to receiving a plurality of grants from a plurality of resources to accept one of the grants according to priorities of the grants, the priorities being inversely related to a number of requests received by resources.

49. The distributed arbiter as recited in claim 48 wherein the requester accepts a grant indicating a particular resource is being allocated to the requester, according to a starvation avoidance mechanism in addition to the priorities.

50. The distributed arbiter as recited in claim 38 wherein a requester is responsive to receiving a plurality of grants from a plurality of resources to accept one of the grants according to a random priority determined for the grants.

51. The distributed arbiter as recited in claim 38 wherein the requesters are nodes of a network coupled to input ports of a network switch and the resources are output ports of the network switch, multiple ones of the output ports being accessible to more than one of the input ports.

52. The distributed arbiter as recited in claim 38 wherein the requesters are processors of a multi-processor system and the resources are memories coupled to the processors, each of the memories being accessible to more than one of the processors.

53. A computer program product encoded in at least one computer readable medium, the computer program product comprising:

a first instruction sequence executable to receive requests for one resource of a plurality of resources from multiple requesters; and a second instruction sequence executable to allocate the one resource to one of the requesters according to requester priorities, requester priorities being inversely related to a number of requests made by each requester for the resources;

a third instruction sequence executable to supply from the requesters, respective requester priority indications to at least the one resource; and wherein the at least one computer readable medium is selected from the set of a disk, tape or other magnetic, optical, or electronic storage medium and a network, wireline, wireless or other communications medium.

54. The computer program product as recited in claim 53 wherein the computer program product further includes a starvation avoidance instruction sequence executable to implement a starvation avoidance mechanism.

55. A computer program product encoded in at least one computer readable medium to implement an arbitration mechanism to determine which of a plurality of grants received by a requester from a plurality of resources, to accept, the computer program product comprising:

a first instruction sequence executable to receive an indication of the grants for respective resources; and a second instruction sequence executable to accept one of the grants according to grant priorities, grant priorities being inversely related to a number of requests received by a resource.

56. The computer program product as recited in claim 55 wherein the computer program product further includes a starvation avoidance instruction sequence executable to implement a starvation avoidance mechanism to accept one of the grants.

* * * * *

UNITED STATES PATENT AND TRADEMARK OFFICE
CERTIFICATE OF CORRECTION

| | | |
|---|---|---|
| PATENT NO. | : 7,006,501 B1 | Page 1 of 1 |
| APPLICATION NO. | : 09/621031 | |
| DATED | : February 28, 2006 | |
| INVENTOR(S) | : Nils Gura and Hans Eberle | |

It is certified that error appears in the above-identified patent and that said Letters Patent is hereby corrected as shown below:

Column 8, line 33, please replace "(MaxRe-1)" with -- (MaxReq-1) --

Column 13, line 2, please replace "from 0.n;" with -- from 0..n; --

Column 19, line 3, please replace "priority-2," with -- priority 2, --

Column 28, line 46, please delete the word "multiple"

Signed and Sealed this

Fifteenth Day of August, 2006

JON W. DUDAS
*Director of the United States Patent and Trademark Office*